US011493266B2

(12) United States Patent
Park et al.

(10) Patent No.: US 11,493,266 B2
(45) Date of Patent: Nov. 8, 2022

(54) PULL DOWN REFRIGERATOR SHELF AND REFRIGERATOR WITH THE SAME

(71) Applicant: SAMSUNG ELECTRONICS CO., LTD., Suwon-si (KR)

(72) Inventors: Kyoungsun Park, Suwon-si (KR); Joongkyung Park, Suwon-si (KR); Myoungjin Jang, Suwon-si (KR); Seongwoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 21 days.

(21) Appl. No.: 17/038,359

(22) Filed: Sep. 30, 2020

(65) Prior Publication Data

US 2021/0095916 A1 Apr. 1, 2021

(30) Foreign Application Priority Data

Sep. 30, 2019 (KR) ........................ 10-2019-0120406

(51) Int. Cl.
| | |
|---|---|
| *F25D 25/02* | (2006.01) |
| *A47B 96/02* | (2006.01) |
| *F16M 13/02* | (2006.01) |
| *F16F 7/00* | (2006.01) |

(52) U.S. Cl.
CPC .......... *F25D 25/024* (2013.01); *A47B 96/025* (2013.01); *F25D 25/02* (2013.01); *F25D 25/027* (2013.01); *F16F 7/00* (2013.01); *F16M 13/022* (2013.01); *F25D 2325/021* (2013.01)

(58) Field of Classification Search
CPC ...... F25D 25/024; F25D 25/02; F25D 25/027; A47B 96/025; F26D 2325/021
See application file for complete search history.

(56) References Cited

U.S. PATENT DOCUMENTS

| 9,170,043 | B2 | 10/2015 | Choo et al. |
| 9,372,027 | B2 | 6/2016 | Yoo et al. |
| 9,464,841 | B2 | 10/2016 | Choo et al. |
| 2014/0125212 | A1 | 5/2014 | Choo et al. |
| 2016/0010915 | A1 | 1/2016 | Choo et al. |

(Continued)

FOREIGN PATENT DOCUMENTS

| JP | 2001-336873 A | 12/2001 |
| JP | 2004-298218 | 10/2004 |
| JP | 2006-162229 A | 6/2006 |

(Continued)

OTHER PUBLICATIONS

International Search Report and Written Opinion of the International Searching Authority dated Dec. 10, 2020 in International Patent Application No. PCT/KR2020/011792.

*Primary Examiner* — Kimberley S Wright
(74) *Attorney, Agent, or Firm* — Staas & Halsey LLP

(57) ABSTRACT

A pull down refrigerator shelf for a storage compartment of a refrigerator, the pull down refrigerator shelf may include a rear shelf plate; a front shelf plate disposed in front of the rear shelf plate and configured to be selectively positioned on a same plane as the rear shelf plate or below the rear shelf plate; and a shelf sliding and lowering mechanism disposed under the rear shelf plate and the front shelf plate and configured to allow the rear shelf plate and the front shelf plate to slide integrally, the shelf sliding and lowering mechanism configured to allow the front shelf plate to lower relative to the rear shelf plate while maintaining a horizontal state.

17 Claims, 25 Drawing Sheets

(56) References Cited

U.S. PATENT DOCUMENTS

2018/0128538 A1   5/2018   Jang et al.

FOREIGN PATENT DOCUMENTS

| | | |
|---|---|---|
| JP | 5224844 B2 | 7/2013 |
| KR | 10-2011-0037553 | 4/2011 |
| KR | 10-1035180 | 5/2011 |
| KR | 10-2015-0031011 | 3/2015 |
| KR | 10-1657118 | 9/2016 |
| KR | 10-1962138 B1 | 3/2019 |
| WO | 2015/155118 | 10/2015 |

PULL DOWN REFRIGERATOR SHELF AND REFRIGERATOR WITH THE SAME

CROSS-REFERENCE TO RELATED APPLICATIONS

This application is based on and claims priority under 35 U.S.C. § 119 to Korean Patent Application No. 10-2019-0120406, filed on Sep. 30, 2019, in the Korean Intellectual Property Office, the disclosure of which is incorporated by reference herein in its entirety.

BACKGROUND

1. Field

The disclosure relates to a refrigerator, and more particularly, to a refrigerator shelf provided in a storage compartment of the refrigerator.

2. Description of the Related Art

Generally, a refrigerator is a device that can store food freshly, and may include a storage compartment provided inside, a main body with an open front surface, a door provided to open and close an opening of the front surface of the main body, and a cooling device to supply cold air to the storage compartment.

The interior of the storage compartment needs to be divided into a plurality of spaces so that various foods can be stored separately by type. Therefore, a plurality of shelves that divide the storage compartment into a plurality of spaces may be disposed inside the main body.

The plurality of shelves are configured to be fixed to a pair of rack bars disposed side by side on the rear surface of the storage compartment of the main body and to adjust the distance between two adjacent shelves.

However, when a large number of objects (for example, various foods) are placed on a shelf fixed inside the main body of the refrigerator, it is difficult for a user to check what is on the back of the shelf and take it out because of the objects on the front of the shelf.

Therefore, in order to check the objects on the back of the shelf, the user needs to remove the objects on the front of the shelf, and then check the objects on the back of the shelf and take them out.

SUMMARY

According to an aspect of the disclosure, a pull down refrigerator shelf may be disposed in a storage compartment of a refrigerator, the pull down refrigerator shelf may include a rear shelf plate; a front shelf plate disposed in front of the rear shelf plate and configured to be selectively positioned on a same plane as the rear shelf plate or below the rear shelf plate; and a shelf sliding and lowering mechanism disposed under the rear shelf plate and the front shelf plate and configured to allow the rear shelf plate and the front shelf plate to slide integrally, the shelf sliding and lowering mechanism configured to allow the front shelf plate to lower relative to the rear shelf plate while maintaining a horizontal state.

The shelf sliding and lowering mechanism may include a left shelf sliding and lowering mechanism and a right shelf sliding and lowering mechanism which are disposed under the rear shelf plate and the front shelf plate and spaced apart by a predetermined distance from each other.

Each of the left shelf sliding and lowering mechanism and the right shelf sliding and lowering mechanism may include: a rear support bracket configured to support the rear shelf plate; a slide rail configured to slide the rear support bracket; a hanger configured to fix the slide rail and detachably disposed in the refrigerator; a support arm rotatably disposed at one end of the rear support bracket and configured to allow the front shelf plate to lower in a horizontal state; a shock absorber disposed on the rear support bracket and supporting one end of the support arm; a front support bracket rotatably disposed at another end of the support arm and configured to support the front shelf plate; and a fixing lever provided in at least one of the left shelf sliding and lowering mechanism and the right shelf sliding and lowering mechanism, the fixing lever configured to allow the front support bracket to be fixed or rotated relative to the support arm.

Each of the left shelf sliding and lowering mechanism and the right shelf sliding and lowering mechanism may include a rear support bracket configured to support the rear shelf plate; a slide rail configured to slide the rear support bracket; a hanger configured to fix the slide rail and detachably disposed in the refrigerator; a front support bracket configured to support the front shelf plate; a first lever including a first end rotatably disposed at the rear support bracket and a second end rotatably disposed at the front support bracket; a second lever disposed parallel to the first lever and including a first end rotatably disposed at the rear support bracket and a second end rotatably disposed at the front support bracket; and a lever guide portion vertically extending from a lower end of the hanger and configured to guide slide movement of the second lever, wherein when the second lever may be moved out of the lever guide portion, the front shelf plate may lower while maintaining a horizontal state.

According to another aspect of the disclosure, a refrigerator may include a main body having an open front surface and a storage compartment therein; a door disposed to open and close the storage compartment of the main body; a pair of rack bars disposed on an inner surface of the storage compartment of the main body; and a pull down refrigerator shelf fixed to the pair of rack bars and including any of the above features.

BRIEF DESCRIPTION OF THE DRAWINGS

These and/or other aspects and advantages of the disclosure will become apparent and more readily appreciated from the following description of the embodiments, taken in conjunction with the accompanying drawings of which.

DETAILED DESCRIPTION OF THE EMBODIMENTS

Hereinafter, embodiments of a pull down refrigerator shelf of the disclosure and a refrigerator having the same will be described in detail with reference to the accompanying drawings.

Various embodiments of the disclosure will hereinafter be described with reference to the accompanying drawings. However, it is to be understood that technologies mentioned in the disclosure are not limited to specific embodiments, but include various modifications, equivalents, and/or alternatives according to embodiments of the disclosure. The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

The terms 'first', 'second', etc. may be used to describe diverse components, but the components are not limited by the terms. The terms may only be used to distinguish one component from the others. For example, without departing from the scope of the present disclosure, a first component may be referred to as a second component, and similarly, a second component may also be referred to as a first component.

The terms used in embodiments of the present disclosure may be construed as commonly known to those skilled in the art unless otherwise defined.

Further, the terms 'leading end', 'rear end', 'upper side', 'lower side', 'top end', 'bottom end', etc. used in the present disclosure are defined with reference to the drawings. However, the shape and position of each component are not limited by the terms.

The disclosure has been developed in order to overcome the above drawbacks and other problems associated with the conventional arrangement. An aspect of the disclosure relates to a pull down refrigerator shelf capable of selectively positioning a front portion of the shelf lower than a rear portion thereof.

Figure 1:
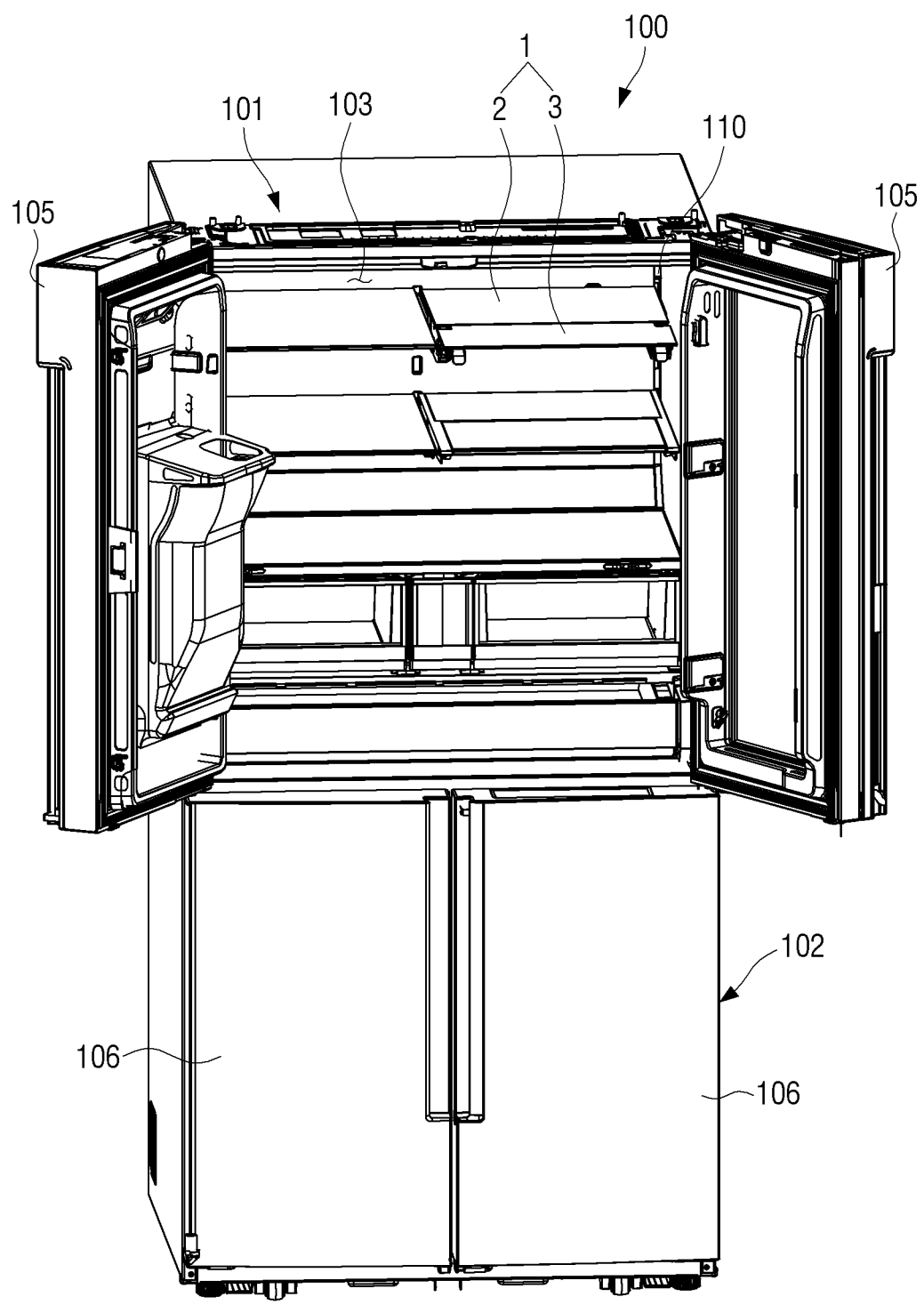
FIG. 1 is a perspective view illustrating a refrigerator having a pull down refrigerator shelf according to an embodiment of the disclosure.

FIG. 1 is a perspective view illustrating a refrigerator having a pull down refrigerator shelf according to an embodiment of the disclosure.

Referring to FIG. 1, a refrigerator 100 having a pull down refrigerator shelf 1 according to an embodiment of the disclosure may include a refrigerator compartment 101 provided at an upper portion thereof and a freezer compartment 102 provided at a lower portion thereof.

A storage space 103, that is, a storage compartment is provided inside the refrigerator compartment 101, and a pair of upper doors 105 that can open and close the storage compartment 103 is provided on the front of the refrigerator compartment 101. The pair of upper doors 105 may be disposed with hinges on the left and right sides of the refrigerator compartment 101 to be rotatable on both sides. A home bar and a dispenser may be provided in the upper door 105.

In the storage compartment 103 of the refrigerator compartment 101, a pull down refrigerator shelf 1 detachably disposed on the inner wall of the storage compartment 103 and configured to adjust a level of a front shelf plate 3 may be provided. An opening communicating with the storage compartment 103 is provided on the front surface of the refrigerator compartment 101. The pair of upper doors 105 are provided to open and close the storage compartment 103 on the front of the refrigerator compartment 101.

A freezing space is provided inside the freezer compartment 102, and a pair of lower doors 106 that can open and close the freezing space is provided on the front surface of the freezer compartment 102. The pair of lower doors 106 may be disposed with hinges on the left and right sides of the freezer compartment 102 to be rotatable on both sides.

In the freezing space of the freezer compartment 102, the pull down refrigerator shelf 1 detachably disposed on the inner wall of the freezer compartment 102 and configured to adjust a level of a front shelf plate 3 may be provided.

The pull down refrigerator shelf 1 according to an embodiment of the disclosure may be disposed in both the refrigerator compartment 101 and the freezer compartment 102. Therefore, in the following description, when necessary, both the refrigerator compartment 101 and the freezer compartment 102 are referred to as main bodies.

The refrigerator 100 shown in FIG. 1 has a structure in which the upper refrigerator compartment 101 is opened and closed by the pair of upper doors 105, and the lower freezer compartment 102 is opened and closed by the pair of lower doors 106. However, the refrigerator 100 to which the pull down refrigerator shelf 1 according to an embodiment of the disclosure is applied is not limited thereto. The pull down refrigerator shelf 1 according to an embodiment of the disclosure may be applied to various types of refrigerators having a structure in which the pull down refrigerator shelf 1 can be disposed inside the storage compartment.

For example, the pull down refrigerator shelf 1 according to an embodiment of the disclosure may be applied to various types of refrigerators such as a French type refrigerator in which a refrigerator compartment is disposed on the upper side of the freezer compartment, the refrigerator compartment is opened and closed by a pair of doors, and the freezer compartment is opened and closed by a single door, a side by side type refrigerator in which a freezer compartment and a refrigerator compartment are arranged to the left and right, a top mounting type refrigerator in which a freezer compartment is disposed over the refrigerator compartment, and the like.

A plurality of pull down refrigerator shelves 1 are disposed in the storage compartment 103 of the refrigerator compartment 101 and are spaced apart from each other. The pull down refrigerator shelf 1 may be supported by a pair of rack bars 110 provided at the rear surface of the storage compartment 103 of the refrigerator compartment 101.

Hereinafter, the pull down refrigerator shelf 1 according to an embodiment of the disclosure will be described in detail with reference to FIGS. 2 to 5.

Figure 2:
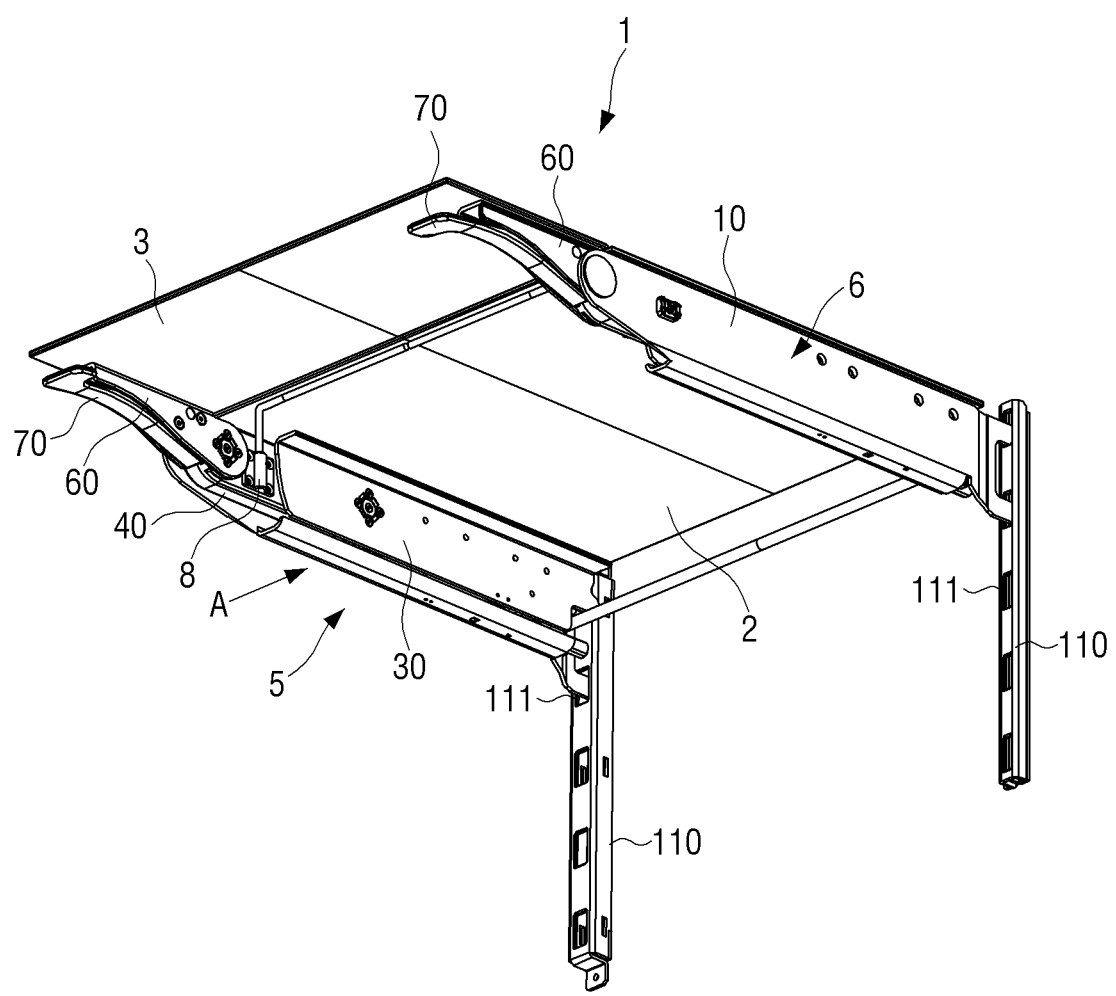
FIG. 2 is a bottom perspective view illustrating a pull down refrigerator shelf according to an embodiment of the disclosure.
Figure 3:
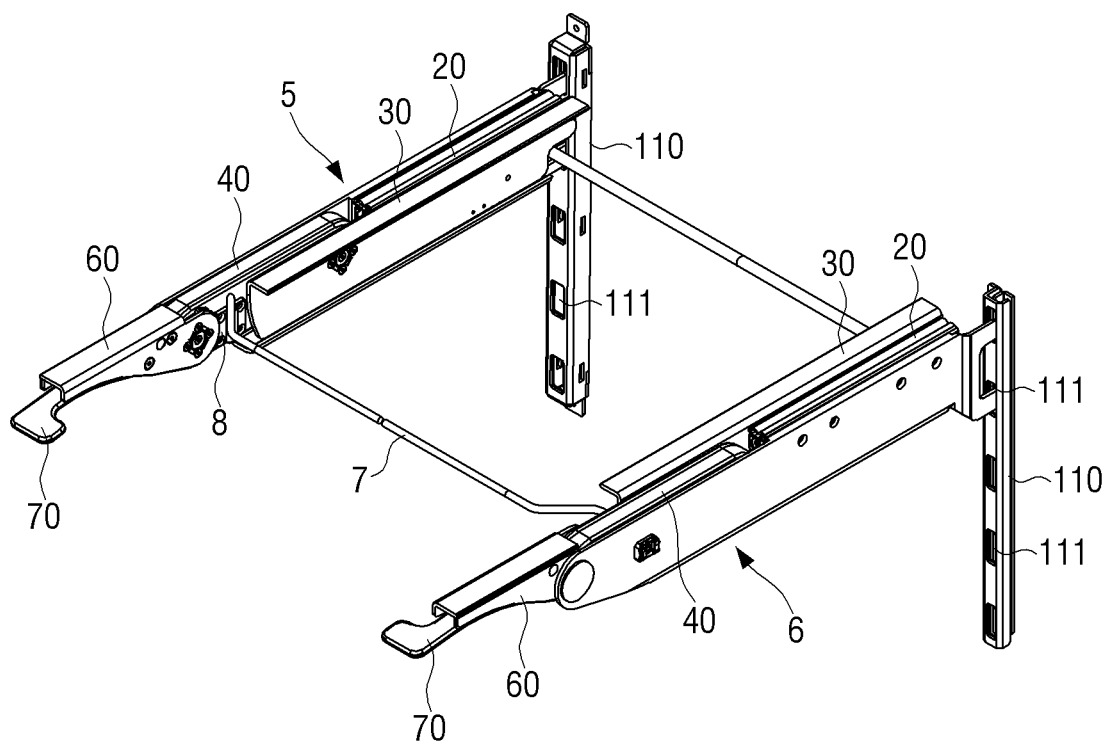
FIG. 3 is a perspective view illustrating a pull down refrigerator shelf according to an embodiment of the disclosure from which a front shelf plate and a rear shelf plate are removed.
Figure 4:
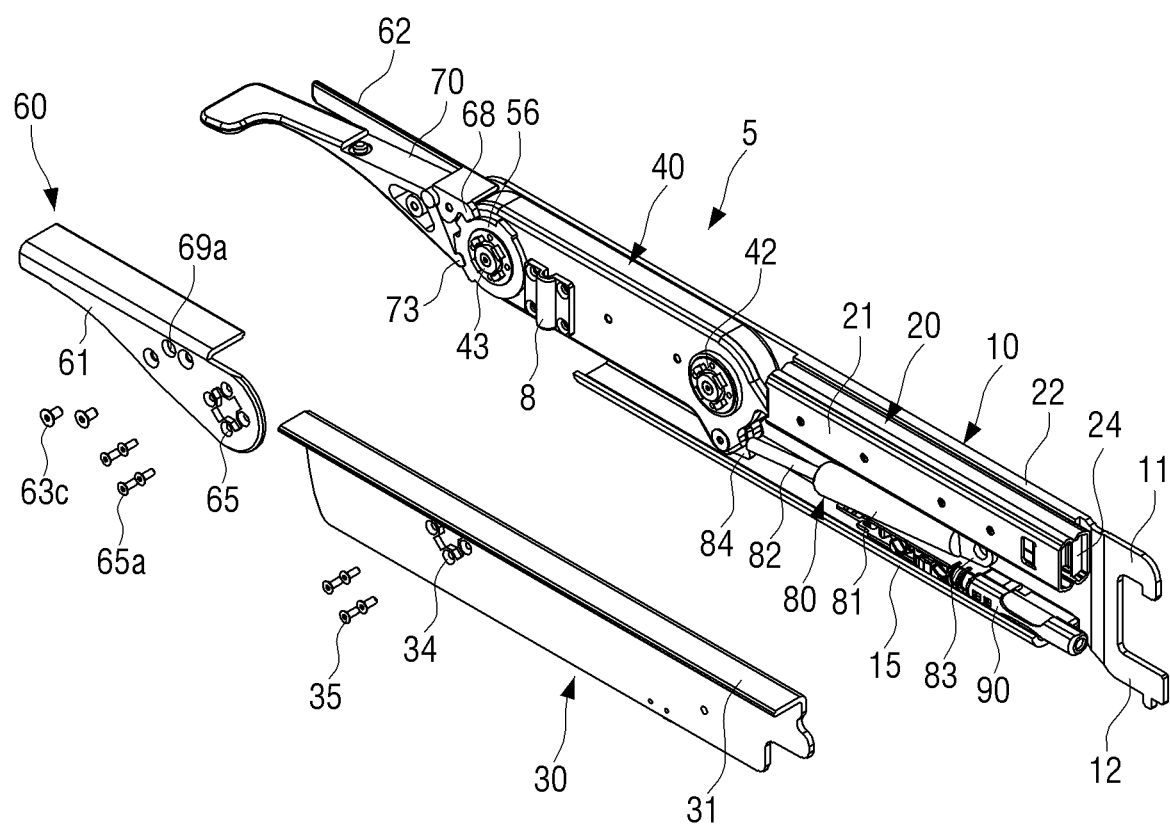
FIG. 4 is a perspective view illustrating a shelf sliding and lowering mechanism of a pull down refrigerator shelf according to an embodiment of the disclosure from which a main front support bracket and a rear support bracket are separated.
Figure 5:
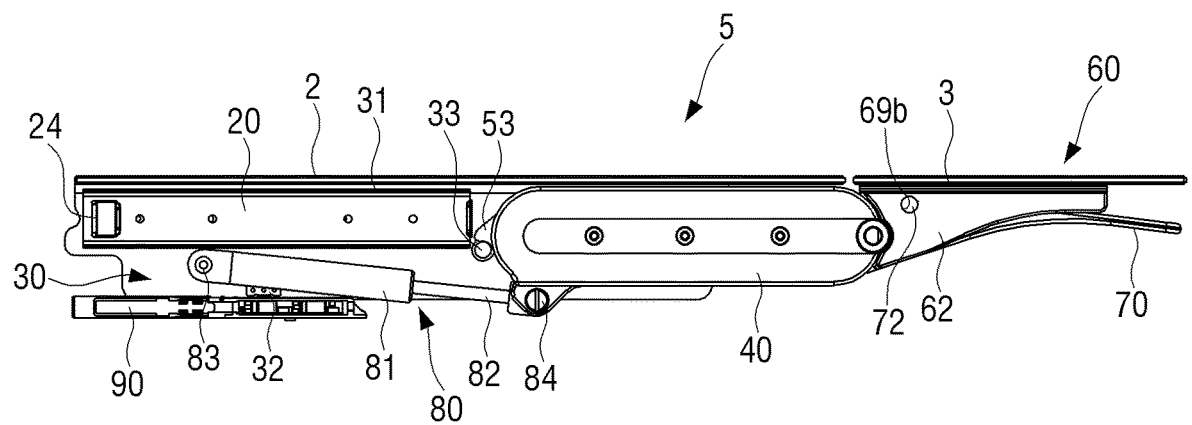
FIG. 5 is a view illustrating the pull down refrigerator shelf of FIG. 2 viewed from the direction A without a hanger.

FIG. 2 is a bottom perspective view illustrating a pull down refrigerator shelf according to an embodiment of the disclosure. FIG. 3 is a perspective view illustrating a pull down refrigerator shelf according to an embodiment of the disclosure from which a front shelf plate and a rear shelf plate are removed. FIG. 4 is a perspective view illustrating a shelf sliding and lowering mechanism of a pull down refrigerator shelf according to an embodiment of the disclosure from which a main front support bracket and a rear support bracket are separated. FIG. 5 is a view illustrating the pull down refrigerator shelf of FIG. 2 viewed from the direction A without a hanger.

Referring to FIGS. 2 to 5, the pull down refrigerator shelf 1 according to an embodiment of the disclosure may include a rear shelf plate 2, a front shelf plate 3, and a shelf sliding and lowering mechanism 5 and 6.

The rear shelf plate 2 may be formed in a rectangular shaped flat plate.

The front shelf plate 3 may be formed in a rectangular shaped flat plate similar to the rear shelf plate 2. The front shelf plate 3 may be formed to have a shorter length than the rear shelf plate 2.

The front shelf plate 3 is disposed at a predetermined distance from the front end of the rear shelf plate 2, and may selectively be positioned on the same plane as the rear shelf plate 2 or below the rear shelf plate 2. In other words, the front shelf plate 3 may be positioned at one of the same level position in which the front shelf plate 3 is positioned at the same level as the rear shelf plate 2 and the low level position in which the front shelf plate 3 is positioned at a lower level than the rear shelf plate 2.

The shelf sliding and lowering mechanism 5 and 6 is disposed under the rear shelf plate 2 and the front shelf plate 3, so that the rear shelf plate 2 and the front shelf plate 3 may slide together as one body and the front shelf plate 3 may lower relative to the rear shelf plate 2 while maintaining a horizontal state.

In detail, the shelf sliding and lowering mechanism 5 and 6 is formed so that when the front shelf plate 3 is pulled, the rear shelf plate 2 is moved linearly together with the front shelf plate 3 while maintaining the same level as the front shelf plate 3. In addition, the shelf sliding and lowering mechanism 5 and 6 is formed so that when the user pushes the front shelf plate 3 downward in the state in which the front shelf plate 3 is moved a predetermined distance, the front shelf plate 3 may remain horizontal and move down to the lower level position.

The shelf sliding and lowering mechanism 5 and 6 may include a left shelf sliding and lowering mechanism 5 and a right shelf sliding and lowering mechanism 6 that are disposed under the front shelf plate 3 and the rear shelf plate 2 and are spaced apart from each other.

Because the left shelf sliding and lowering mechanism 5 and the right shelf sliding and lowering mechanism 6 are formed in the same structure, only the left shelf sliding and lowering mechanism 5 will be described below. However, for convenience of explanation, the left shelf sliding and lowering mechanism 5 will be referred to as a shelf sliding and lowering mechanism 5 below.

Referring to FIGS. 4 and 5, the shelf sliding and lowering mechanism 5 may include a hanger 10, a slide rail 20, a rear support bracket 30, a support arm 40, a front support bracket 60, and a fixing lever 70.

The hanger 10 allows the pull down refrigerator shelf 1 to be detachably disposed in the storage compartment 103 of the refrigerator 100. At the rear end of the hanger 10, a hooking jaw 11 and a support protrusion 12.

The hooking jaw 11 protrudes a predetermined length from the rear end of the hanger 10, and the tip of the hooking jaw 11 is bent approximately 90 degrees downward. Therefore, the hooking jaw 11 may be inserted into and caught by an engaging hole 111 of the rack bar 110 as illustrated in FIGS. 2 and 3.

The support protrusion 12 protrudes from the rear end of the hanger 10 longer than the hooking jaw 11 and is formed to be inserted into the engaging hole 111 of the rack bar 110. The support protrusion 12 is supported by the rear surface of the storage compartment 103 of the refrigerator 100. In addition, the support protrusion 12 is formed spaced apart a predetermined distance below the hooking jaw 11. The gap between the hooking jaw 11 and the support protrusion 12 is formed to correspond to the gap between the two adjacent engaging holes 111 provided in the rack bar 110.

Therefore, the hooking jaw 11 and the support protrusion 12 of the hanger 10 are simultaneously inserted into the two engaging hole 111 of the rack bar 110, and when the hanger 10 is moved down a certain distance, the hooking jaw 11 of the hanger 10 is caught by the rack bar 110 so that the hanger 10 does not fall out. To remove the hanger 10 from the rack bar 110, when the hanger 10 is raised, the hooking jaw 11 and the support protrusion 12 of the hanger 10 may be removed from the engaging holes 111 of the rack bar 110.

On the inner surface of the hanger 10, the slide rail 20 is disposed adjacent to the hooking jaw 11. Here, the inner surface of the hanger 10 refers to a surface facing the hanger 10 of the right shelf sliding and lowering mechanism 6.

The slide rail 20 may include an upper slide rail 21 and a lower slide rail 22, and the upper slide rail 21 and the lower slide rail 22 are formed to slide in a straight line with respect to each other. The lower slide rail 22 is fixed to the inner surface of the hanger 10. The upper slide rail 21 is fixed to the rear support bracket 30. Therefore, the rear support bracket 30 may slide relative to the hanger 10.

The slide rail 20 is provided with a rail stopper that restricts the movement of the upper slide rail 21. The rail stopper may include a front rail stopper (not illustrated) disposed at the front end of the slide rail 20 and a rear rail stopper 24 disposed at the rear end of the slide rail 20.

The front rail stopper is disposed to limit the distance that the upper slide rail 21 moves forward. The rear rail stopper 24 is formed to block the upper slide rail 21 from moving toward the rear of the hanger 10, that is, toward the hooking jaw 11. Therefore, the upper slide rail 21 may not move to the rear of the hanger 10.

In addition, a damper 90 may be provided on the inner surface of the hanger 10. The damper 90 is disposed adjacent to the support protrusion 12 under the slide rail 20. The lower end of the hanger 10 may be provided with a damper support 15 to support the damper 90. The damper support 15 is formed to extend approximately 90 degrees from the lower end of the hanger 10.

The damper 90 is formed to cushion the impact of the slide movement of the rear support bracket 30. For example, when the rear support bracket 30 moves backward and stops, the damper 90 reduces the moving speed of the rear support bracket 30 so that the rear support bracket 30 stops smoothly.

To this end, a damper operator 32 capable of operating the damper 90 may be disposed in the rear support bracket 30. Therefore, when the damper operator 32 operates the damper 90 while the rear support bracket 30 moves rearward, the rear support bracket 30 is smoothly stopped by the damper 90.

As another example, the damper 90 may be disposed on the hanger 10 of only one of the left shelf sliding and lowering mechanism 5 and the right shelf sliding and lowering mechanism 6. As another example, the damper 90 may not be provided on both the left shelf sliding and lowering mechanism 5 and the right shelf sliding and lowering mechanism 6.

The rear support bracket 30 is formed to support the rear shelf plate 2. The rear support bracket 30 is formed in a rectangular plate shape having a long length, the upper end of the rear support bracket 30 is bent approximately 90 degrees to form a bent portion 31. The rear shelf plate 2 is placed on the bent portion 31 of the rear support bracket 30.

The support arm 40 is rotatably disposed in the rear support bracket 30. The support arm 40 allows the front shelf plate 3 to lower in a horizontal state. The support arm 40 is formed in a substantially rectangular parallelepiped shape with a long length, and one end thereof is rotatably disposed in the rear support bracket 30.

A shock absorber 80 is provided in the rear support bracket 30 and is formed to support one end of the support arm 40 and to limit the rotation of the support arm 40. One end 84 of the shock absorber 80 is rotatably coupled to the lower side of one end of the support arm 40, and the other end 83 thereof is rotatably disposed in the rear support bracket 30.

For example, the shock absorber 80 may include a cylinder 81 and a rod 82. The rod 82 is inserted into the cylinder 81, and may move linearly with respect to the cylinder 81. One end 83 of the cylinder 81 is rotatably disposed in the rear support bracket 30, and one end 84 of the rod 82 is rotatably disposed in the support arm 40. In other words, one end 84 of the rod 82 is rotatably coupled to a protrusion formed on the lower side of the one end of the support arm 40.

The shock absorber 80 supports the support arm 40 to maintain a horizontal state. At this time, a projecting part 53 provided at the rear end of the support arm 40 interferes with the stopper 33 provided at the rear support bracket 30. In other words, the rear support bracket 30 is provided with the stopper 33 to limit the rotation of the support arm 40, and one end of the support arm 40 is provided with the projecting part 53 that interferes with the stopper 33.

Thus, as illustrated in FIG. 5, the support arm 40 may be maintained in a horizontal state, that is, in a state in which the front shelf plate 3 is at the same level as the rear shelf plate 2 by the shock absorber 80 and the stopper 33.

The front support bracket 60 is rotatably disposed at the other end of the support arm 40 and is formed to support the front shelf plate 3. The front support bracket 60 may include the fixing lever 70. The fixing lever 70 allows the front support bracket 60 to be fixed or rotated relative to the other end of the support arm 40.

Hereinafter, the structures of the support arm 40 and the front support bracket 60 will be described in detail with reference to FIG. 6.

Figure 6:
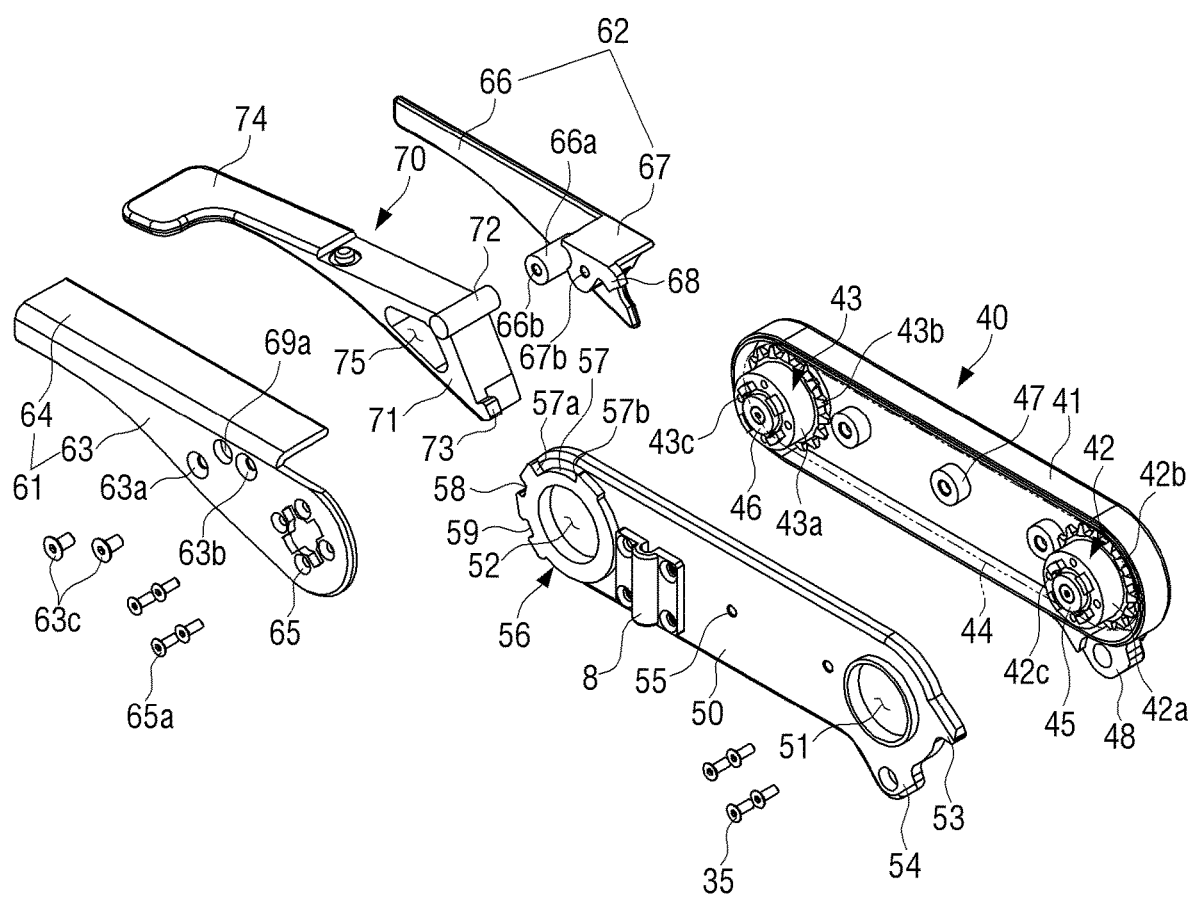
FIG. 6 is an exploded perspective view illustrating a support arm and a front support bracket of a shelf sliding and lowering mechanism of a pull down refrigerator shelf according to an embodiment of the disclosure.

FIG. 6 is an exploded perspective view illustrating a support arm and a front support bracket of a shelf sliding and lowering mechanism of a pull down refrigerator shelf according to an embodiment of the disclosure.

Referring to FIG. 6, the support arm 40 may include a housing 41, a first sprocket 42, a second sprocket 43, a chain 44, and a housing cover 50.

The housing 41 is formed in a container having a substantially rectangular parallelepiped shape with a long length, and has an opened upper surface. A first fixed shaft 45 and a second fixed shaft 46 are provided to protrude from the bottom surface of the housing 41. The first and second fixed shafts 45 and 46 are disposed adjacent to both ends of the housing 41. The first fixed shaft 45 is disposed at one end portion of the housing adjacent to the slide rail 20, and the second fixed shaft 46 is disposed at the other end portion of the housing 41 adjacent to the front support bracket 60.

A plurality of fixing protrusions 47 may be provided between the first and second fixed shafts 45 and 46 disposed on the bottom surface of the housing 41. Each of the fixing protrusions 47 is provided with a female screw so that the housing cover 50 may be fixed to the fixing protrusions 47 with screws.

A first connection protrusion 48 to which the rod 82 of the shock absorber 80 is rotatably connected is provided on the lower side of one end of the housing 41.

The first sprocket 42 is rotatably disposed in the first fixed shaft 45 of the housing 41, and the second sprocket 43 is rotatably disposed in the second fixed shaft 46 of the housing 41.

The first sprocket 42 includes a hollow cylindrical body 42a and a sprocket 42b formed along the outer circumferential surface of the cylindrical body 42a. A plurality of fixing holes 42c are provided on the upper surface of the cylindrical body 42a. A female screw is formed in each of the plurality of fixing holes 42c.

The rear support bracket 30 is fixed to the plurality of fixing holes 42c. Therefore, the rear support bracket 30 is provided with a plurality of through holes 34 corresponding to the plurality of fixing holes 42c of the first sprocket 42. In the case of this embodiment, because the four fixing holes 42c are provided in the first sprocket 42, four through holes 34 are provided in the rear support bracket 30. Therefore, the rear support bracket 30 may be fixed to the first sprocket 42 with four screws 35.

The first fixed shaft 45 is inserted into the hollow of the cylindrical body 42a of the first sprocket 42. A bearing (not illustrated) is disposed between the first fixed shaft 45 and the first sprocket 42. Therefore, the first sprocket 42 may freely rotate with respect to the first fixed shaft 45. Accordingly, the support arm 40 provided with the first sprocket 42 may rotate relative to the rear support bracket 30.

The second sprocket 43 is formed in the same way as the first sprocket 42. In detail, the second sprocket 43 includes a hollow cylindrical body 43a and a sprocket 43b formed along the outer circumferential surface of the cylindrical body 43a. A plurality of fixing holes 43c are provided in the upper surface of the cylindrical body 43a. A female screw is formed in each of the plurality of fixing holes 43c.

The front support bracket 60 is fixed to the plurality of fixing holes 43c. Therefore, the front support bracket 60 is provided with a plurality of through holes 65 corresponding to the plurality of fixing holes 43c of the second sprocket 43. In the case of this embodiment, because the four fixing holes 43c are provided in the second sprocket 43, four through holes 65 are provided in the front support bracket 60. Therefore, the front support bracket 60 may be fixed to the second sprocket 43 with four screws 65a.

The second fixed shaft 46 is inserted into the hollow of the cylindrical body 43a of the second sprocket 43. A bearing (not illustrated) is disposed between the second fixed shaft 46 and the second sprocket 43. Therefore, the second sprocket 43 may freely rotate with respect to the second fixed shaft 46. Accordingly, the front support bracket 60 may rotate relative to the support arm 40 provided with the second sprocket 43.

The chain 44 is wound around the first sprocket 42 and the second sprocket 43. Therefore, rotation of each of the first sprocket 42 and the second sprocket 43 may be transmitted through the chain 44. For example, when the first sprocket 42 rotates, the second sprocket 43 is rotated by the chain 44. Conversely, when the second sprocket 43 rotates, the first sprocket 42 is rotated by the chain 44. At this time, the first sprocket 42 and the second sprocket 43 are formed in the same shape, the same rotation speed is transmitted.

The housing cover 50 covers the opening of the housing 41 and is formed to rotatably support the first sprocket 42 and the second sprocket 43. The housing cover 50 is formed in a substantially rectangular shaped plate having a long length. A first support hole 51 and a second support hole 52 into which the first sprocket 42 and the second sprocket 43 are inserted are provided at both end portions of the housing cover 50.

The first support hole 51 is formed so that the upper end of the cylindrical body 42a of the first sprocket 42 may be inserted into the first support hole 51. The second support hole 52 is formed so that the upper end of the cylindrical body 43a of the second sprocket 43 may be inserted into the second support hole 52. Therefore, when the housing cover 50 is coupled to the housing 41, the first sprocket 42 and the second sprocket 43 may freely rotate.

In addition, a plurality of through holes 55 are provided between the first support hole 51 and the second support hole 52 of the housing cover 50. The plurality of through holes 55 are formed to correspond to the plurality of fixing protrusions 47 of the housing 41. Therefore, the housing cover 50 may be fixed to the housing 41 with a plurality of screws.

One end of the housing cover 50 is provided with the projecting part 53 that interferes with the stopper 33 of the rear support bracket 30. A second connection protrusion 54 corresponding to the first connection protrusion 48 of the housing 41 may be provided below the projecting part 53. One end 84 of the rod 82 of the shock absorber 80 is rotatably coupled between the first connection protrusion 48 of the housing 41 and the second connection protrusion 54 of the housing cover 50.

A fixing bracket 8 capable of fixing the fixing bar 7 may be provided on one surface of the housing cover 50. The fixing bar 7 may be formed to support the bottom of the front end of the rear shelf plate 2.

In addition, a fixed ring plate 56 may be provided around the second support hole 52 of the housing cover 50. The fixed ring plate 56 is formed to correspond to the fixing lever 70, and may allow the front support bracket 60 to be rotated or fixed relative to the support arm 40.

The fixed ring plate 56 is formed in a substantially ring shape, and has an inner hole formed in the same manner as the second support hole 52 of the housing cover 50. A plurality of grooves for fixing or rotating the front support bracket 60 may be provided on the outer circumferential surface of the fixed ring plate 56. For example, an operating groove 57, an upper fixing groove 58, and a lower fixing groove 59 may be sequentially formed along the outer circumferential surface of the fixed ring plate 56.

The operating groove 57 is formed on the outer circumferential surface of the fixed ring plate 56 to limit the rotation angle of the front support bracket 60. An engaging protrusion 68 of the front support bracket 60 is inserted into the operating groove 57, and the operating groove 57 is formed in an arc shape having a width larger than the width of the engaging protrusion 68. Therefore, when the front support bracket 60 is rotated, the engaging protrusion 68 may be moved at a certain angle along the operating groove 57 of the fixed ring plate 56. The movement of the engaging protrusion 68 is restricted by the first end 57a and the second end 57b of the operating groove 57.

The upper fixing groove 58 is formed on one side of the operating groove 57 on the outer circumferential surface of the fixed ring plate 56. Referring to FIG. 6, the upper fixing groove 58 is formed on the left side of the operating groove 57, that is, adjacent to the first end 57a of the operating groove 57. In detail, the upper fixing groove 58 is formed at a position where a fixing protrusion 73 of the fixing lever 70 are engaged when the front shelf plate 3 is positioned below the rear shelf plate 2.

The upper fixing groove 58 is formed in a shape corresponding to the fixing protrusion 73 of the fixing lever 70. Therefore, when the fixing protrusion 73 of the fixing lever 70 is inserted into the upper fixing groove 58 of the fixed ring plate 56, the fixing lever 70 does not rotate relative to the support arm 40. Because the fixing lever 70 is disposed in the front support bracket 60, when the fixing lever 70 is fixed by the upper fixing groove 58 of the fixed ring plate 56, the front support bracket 60 is also fixed to the support arm 40 and does not rotate.

The lower fixing groove 59 is formed on one side of the upper fixing groove 58 on the outer circumferential surface of the fixed ring plate 56. Referring to FIG. 6, the lower fixing groove 59 is formed on the left side of the upper fixing groove 58. In detail, the lower fixing groove 59 is formed at a position where the fixing protrusion 73 of the fixing lever 70 is engaged when the front shelf plate 3 is positioned on the same plane as the rear shelf plate 2.

The lower fixing groove 59 is formed in a shape corresponding to the fixing protrusion 73 of the fixing lever 70. Therefore, when fixing protrusion 73 of the fixing lever 70 is inserted into the lower fixing groove 59 of the fixed ring plate 56, the fixing lever 70 does not rotate relative to the support arm 40. Because the fixing lever 70 is disposed on the front support bracket 60, when the fixing lever 70 is fixed by the lower fixing groove 59 of the fixed ring plate 56, the front support bracket 60 is also fixed to the support arm 40 and does not rotate.

The front support bracket 60 supports the front shelf plate 3 and is rotatably disposed at one end of the support arm 40. In detail, the front support bracket 60 is fixed to one end of the second sprocket 43 exposed through the housing cover 50 of the support arm 40 and may rotate integrally with the second sprocket 43. Because the second sprocket 43 may freely rotate relative to the support arm 40, the front support bracket 60 may also rotate relative to the support arm 40.

The front support bracket 60 may include the engaging protrusion 68 that is coupled to the operating groove 57 of the fixed ring plate 56 and limits the rotation angle of the front support bracket 60.

The front support bracket 60 may include a main front support bracket 61 and a sub front support bracket 62. The main front support bracket 61 is fixed to the second sprocket 43. The main front support bracket 61 may include a main fixing part 63 that is fixed to the second sprocket 43 and is formed in a flat plate shape and a shelf support part 64 that is bent at approximately 90 degrees with respect to the main fixing part 63 and supports the front shelf plate 3.

The main fixing part 63 is provided with a plurality of through holes 65 corresponding to the plurality of fixing holes 43c of the second sprocket 43. In the case of this embodiment, because the four fixing holes 43c are provided in the second sprocket 43, the four through holes 65 are provided in the main front support bracket 61. Therefore, the main front support bracket 61 may be fixed to the second sprocket 43 with four screws 65a.

The sub front support bracket 62 is fixed to the main front support bracket 61. The sub front support bracket 62 may include a sub fixing part 66 corresponding to the main fixing part 63 of the main front support bracket 61 and a protrusion support part 67 extending perpendicularly from the sub fixing part 66.

The sub fixing part 66 may include a fixing rod 66a so that the sub fixing part 66 is spaced apart by a predetermined distance from and is coupled to the main fixing part 63. A first fixing groove 66b in which a female screw is formed is provided at the tip of the fixing rod 66a. In addition, the engaging protrusion 68 configured to be inserted into the operating groove 57 of the fixed ring plate 56 is provided at the side surface of the protrusion support part 67. A second fixing groove 67b in which a female screw is formed is provided at the tip of the protrusion support part 67.

The main front support bracket 61 is provided with first and second fixing holes 63a and 63b corresponding to the first and second fixing grooves 66b and 67b of the sub front support bracket 62. Therefore, the main front support bracket 61 and the sub front support bracket 62 are coupled to each other by using the first and second fixing holes 63a and 63b, the first and second fixing grooves 66b and 67b, and two screws 63, thereby forming the front support bracket 60.

In this embodiment, the front support bracket 60 is composed of the main front support bracket 61 and the sub front support bracket 62. However, as another example, the front support bracket 60 may be formed in a single body.

In addition, a shaft hole 69a into which one end of a rotating shaft 72 of the fixing lever 70 is inserted is provided between the first fixing hole 63a and the second fixing hole 63b of the main front support bracket 61, and a shaft hole 69b into which the other end of the rotating shaft 72 of the fixing lever 70 is inserted is provided between the fixing rod 66a and the protrusion support part 67 of the sub front support bracket 62.

The fixing lever 70 may be disposed in a space between the main front support bracket 61 and the sub front support bracket 62. The fixing lever 70 may be disposed to rotate at a certain angle with respect to the front support bracket 60. The fixing lever 70 allows the front support bracket 60 to be fixed to or to rotate at a certain angle relative to the other end of the support arm 40. To this end. The fixing lever 70 may include the fixing protrusion 73 inserted into one of the upper fixing groove 58 and the lower fixing groove 59 of the fixed ring plate 56 of the support arm 40.

As an example, referring to FIG. 6, the fixing lever 70 may be formed in a triangular shaped lever body 71. The rotating shaft 72 is provided at a first vertex of the lever body 71. The rotating shaft 72 supports the fixing lever 70 to rotate relative to the front support bracket 60. In detail, when both ends of the rotating shaft 72 are inserted into the shaft holes 69a and 69b of the main front support bracket 61 and the sub front support bracket 62, the fixing lever 70 may rotate relative to the front support bracket 60 about the rotating shaft 72.

The fixing protrusion 73 is provided at the second vertex of the lever body 71. The fixing protrusion 73 is formed to be inserted into one of the upper fixing groove 58 and the lower fixing groove 59 of the fixed ring plate 56. Because the fixing protrusion 73 is formed in a shape corresponding to the upper fixing groove 58 and the lower fixing groove 59 of the fixed ring plate 56, when the fixing protrusion 73 is inserted into the upper fixing groove 58 or the lower fixing groove 59 of the fixed ring plate 56, the fixing lever 70 may not rotate relative to the support arm 40.

A handle 74 is provided near the third vertex of the lever body 71. When a force is applied to the handle 74, the lever body 71 may rotate about the rotating shaft 72. A through hole 75 is formed in the center of the lever body 71. The fixing bar 66a provided in the front support bracket 60 may be inserted into the through hole 75. The through hole 75 may be formed in a triangular shape, roughly similar to the lever body 71.

Hereinafter, the operation of the front support bracket 60 and the fixing lever 70 with respect to the fixed ring plate 56 of the support arm 40 will be described in detail with reference to FIGS. 7A, 7B, and 7C.

Figure 7A:
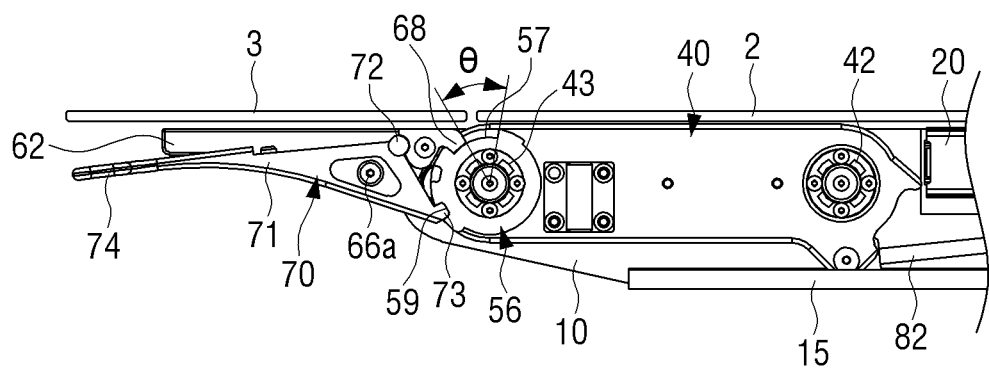
FIG. 7A is a view illustrating a state of a fixing lever and a fixed ring plate when a front shelf plate is positioned on the same plane as a rear shelf plate in a pull down refrigerator shelf according to an embodiment of the disclosure.

FIG. 7A is a view illustrating a state of a fixing lever and a fixed ring plate when a front shelf plate is positioned on the same plane as a rear shelf plate in a pull down refrigerator shelf according to an embodiment of the disclosure. FIG. 7B is a view illustrating a state in which the fixing lever is removed from the fixed ring plate. FIG. 7C is a view illustrating a state of the fixing lever and the fixed ring plate when the front shelf plate is positioned below the rear shelf plate.

As illustrated in FIG. 7A, when the front shelf plate 3 is positioned on the same plane as the rear shelf plate 2, the engaging protrusion 68 of the front support bracket 60 is inserted into the operating groove 57 of the fixed ring plate 56 and is in contact with the first end 57a, and the fixing protrusion 73 of the fixing lever 70 is inserted into the lower fixing groove 59 of the fixed ring plate 56. Therefore, because the front support bracket 60 is fixed relative to the support arm 40 and does not rotate, the front shelf plate 3 is also positioned on the same plane as the rear shelf plate 2.

Figure 7B:
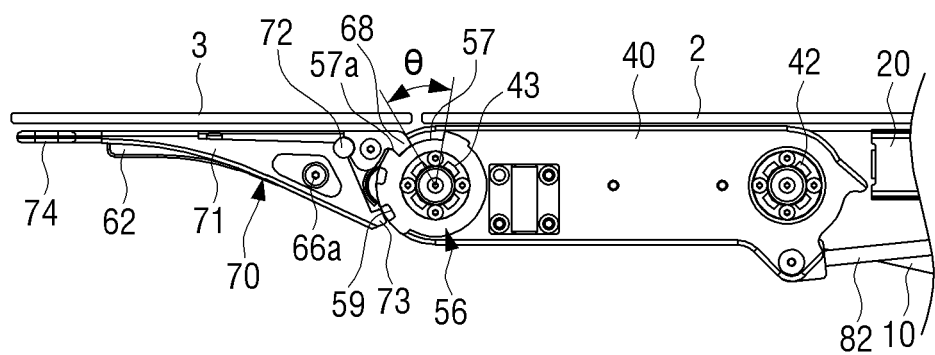
FIG. 7B is a view illustrating a state in which the fixing lever is removed from the fixed ring plate.

In this state, when a force is applied to the handle 74 of the fixing lever 70, the fixing lever 70 rotates in a clockwise direction about the rotating shaft 72, so that the fixing protrusion 73 of the fixing lever 70 is removed from the lower fixing groove 59 of the fixed ring plate 56 of the support arm 40 as illustrated in FIG. 7B. Thus, the engaging protrusion 68 of the front support bracket 60 may rotate a certain angle θ in the operating groove 57 of the fixed ring plate 56. In other words, when the fixing protrusion 73 of the fixing lever 70 is pulled out from the lower fixing groove 59 of the fixed ring plate 56, the front support bracket 60 may rotate at a certain angle relative the support arm 40.

Figure 7C:
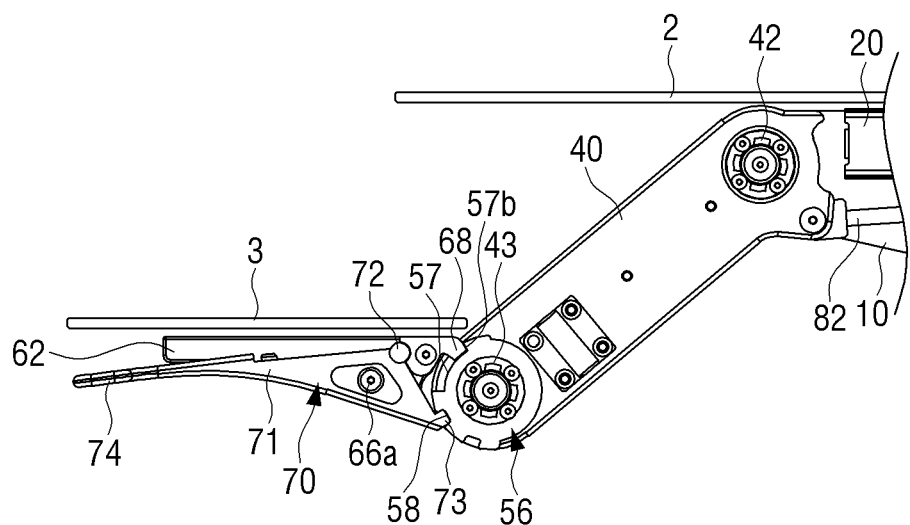
FIG. 7C is a view illustrating a state of the fixing lever and the fixed ring plate when the front shelf plate is positioned below the rear shelf plate.

As illustrated in FIG. 7C, when the front support bracket 60 rotates at a certain angle, the fixing protrusion 73 of the fixing lever 70 is inserted into the upper fixing groove 58 of the fixed ring plate 56. In other words, when the engaging protrusion 68 of the front support bracket 60 contacts the second end 57b of the operating groove 57 of the fixed ring plate 56, the fixing protrusion 73 of the fixing lever 70 is inserted into the upper fixing groove 58 of the fixed ring plate 56, so that the front support bracket 60 does not rotate relative to the support arm 40. At this time, the front shelf plate 3 supported by the front support bracket 60 is positioned below the rear shelf plate 2 in a horizontal state.

Hereinafter, a method of positioning the front shelf plate 3 below the rear shelf plate 2 will be described in detail with reference to FIGS. 8 and 9.

Figure 8:
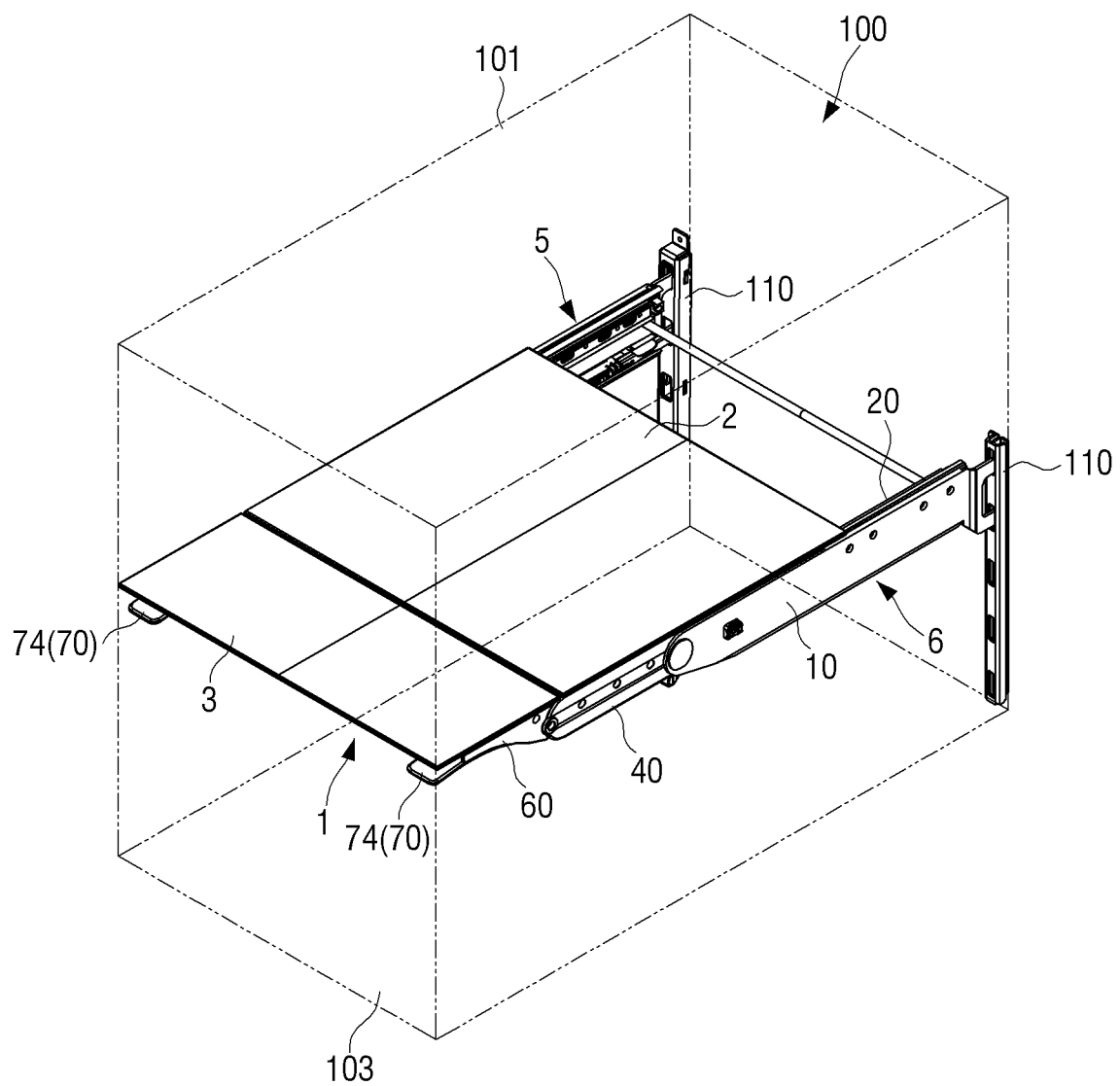
FIG. 8 is a perspective view illustrating a state in which a front shelf plate and a rear shelf plate are slid forward in a pull down refrigerator shelf according to an embodiment of the disclosure.

FIG. 8 is a perspective view illustrating a state in which a front shelf plate and a rear shelf plate are slid forward in a pull down refrigerator shelf according to an embodiment of the disclosure. FIG. 9 is a view illustrating a state in which a front shelf plate is positioned below a rear shelf plate in a pull down refrigerator shelf according to an embodiment of the disclosure.

In order to position the front shelf plate 3 below the rear shelf plate 2, first, as illustrated in FIG. 8, the front shelf plate 3 and the rear shelf plate 2 are forced to move forward, that is, toward the door 105 of the refrigerator 100. When the user opens the refrigerator door 105 and pulls the front shelf plate 3 forward, the front shelf plate 3 and the rear shelf plate 2 move together in front.

Figure 9:
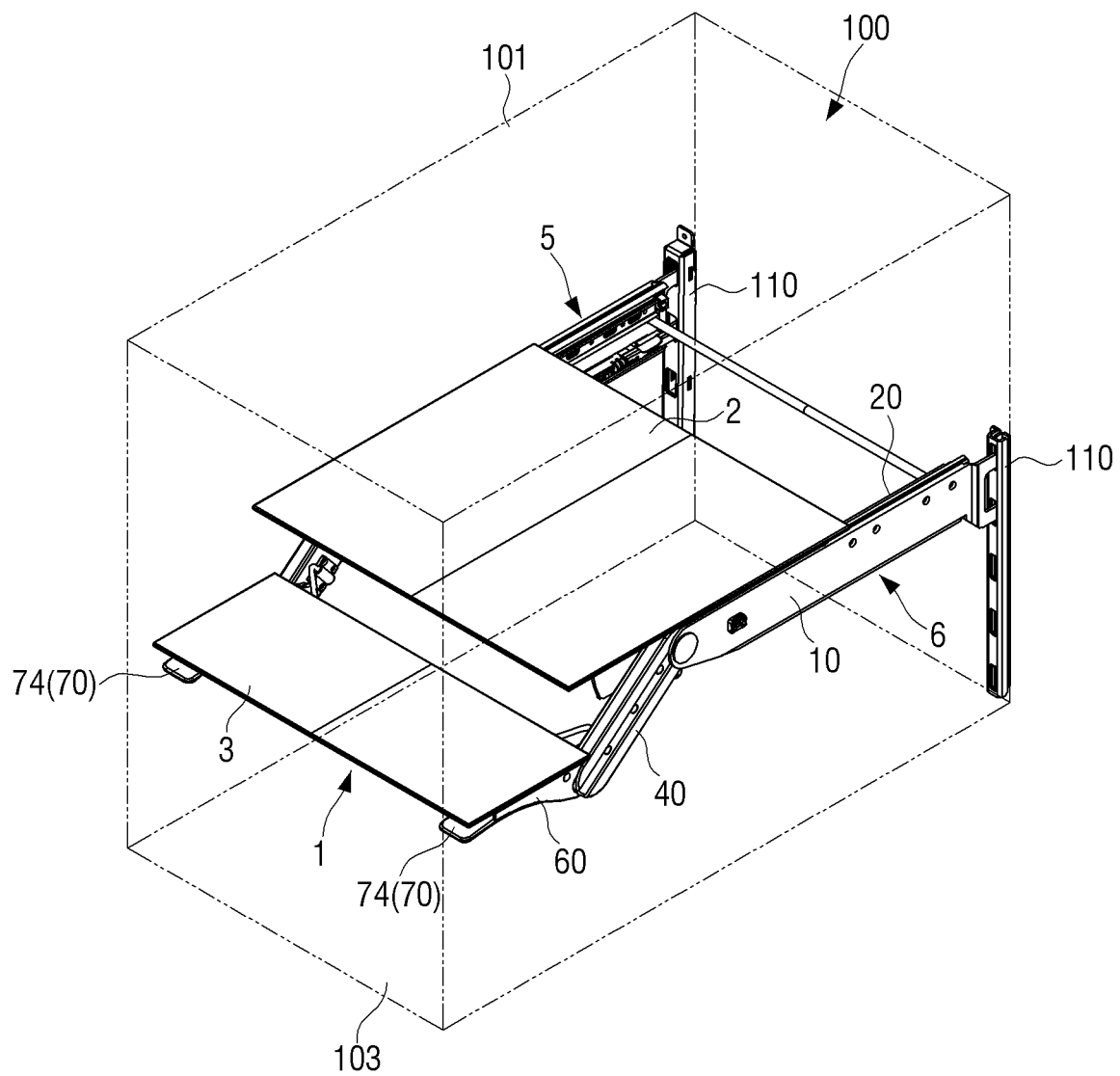
FIG. 9 is a view illustrating a state in which a front shelf plate is positioned below a rear shelf plate in a pull down refrigerator shelf according to an embodiment of the disclosure.

In this state, when the user raises the fixing lever 70, and then pushes the front shelf plate 3 downward or lowers the front support bracket 60 downward, the front shelf plate 3 moves downward while maintaining a horizontal state, and becomes a state as illustrated in FIG. 9. When the front shelf plate 3 is moved downward as illustrated in FIG. 9, the user may easily check the objections on the rear shelf plate 2.

Hereinafter, the operation of lowering the front shelf plate 3 of the pull down refrigerator shelf 1 according to an embodiment of the disclosure will be described in detail with reference to FIGS. 10A to 10E.

FIGS. 10A, 10B, 10C, 10D, and 10E are views for explaining an operation of a pull down refrigerator shelf according to an embodiment of the disclosure.

Figure 10A:
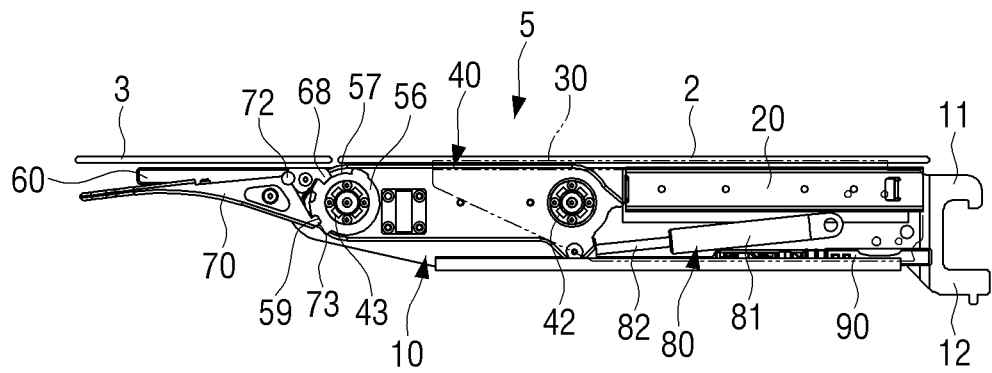
FIGS. 10A, 10B, 10C, 10D, and 10E are views for explaining an operation of a pull down refrigerator shelf according to an embodiment of the disclosure.

Referring to FIG. 10A, the front shelf plate 3 is positioned at the same level, that is, on the same plane as the rear shelf plate 2. In addition, both the front shelf plate 3 and the rear shelf plate 2 are located at the innermost side of the storage compartment 103 of the refrigerator 100 (hereinafter, this position is referred to as an original position). At this time, the support arm 40 is also in a horizontal state, and the front support bracket 60 maintains a horizontal state like the support arm 40.

The support arm 40 is supported by the shock absorber 80 disposed on the rear support bracket 30 to maintain a horizontal state. In addition, the engaging protrusion 68 of the front support bracket 60 is in contact with the first end 57a of the operating groove 57 of the fixed ring plate 56 of the support arm 40, and the fixing protrusion 73 of the fixing lever 70 is inserted into the lower fixing groove 59 of the fixed ring plate 56.

Figure 10B:
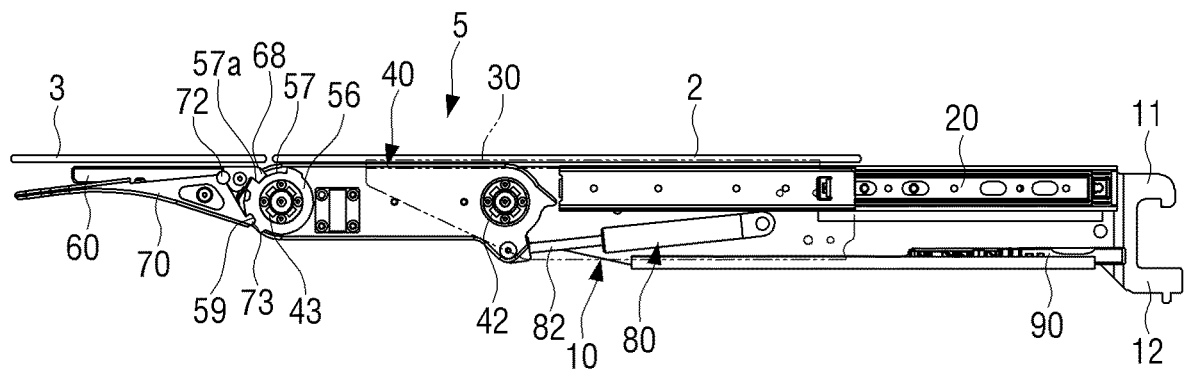

Next, the front shelf plate 3 is pulled out. Thus, the front shelf plate 3 and the rear shelf plate 2 are integrally moved to be positioned at the front of the refrigerator 100 as illustrated in FIG. 10B. At this time, the slide rail 20 and the first sprocket 42 of the support arm 40 are fixed to the rear support bracket 30, and the front support bracket 60 is fixed to the second sprocket 43 of the support arm 40, so that when the front shelf plate 3 is pulled, the rear shelf plate 2 supported by the rear support bracket 30 is also moved integrally.

Figure 10C:
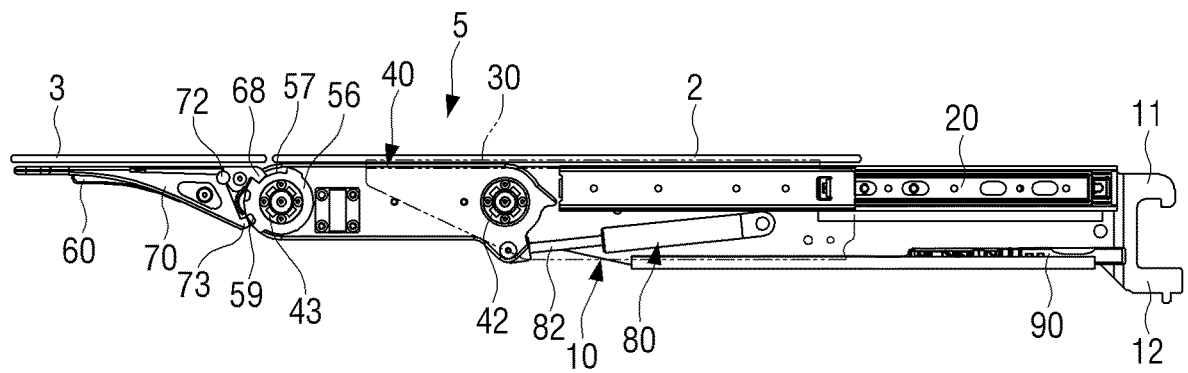

Subsequently, the fixing lever 70 disposed on the front support bracket 60 is raised. Thus, as illustrated in FIG. 10C, the fixing lever 70 is rotated clockwise about the rotating shaft 72, so that the fixing protrusion 73 of the fixing lever 70 is released from the lower fixing groove 59 of the fixed ring plate 56.

Figure 10D:
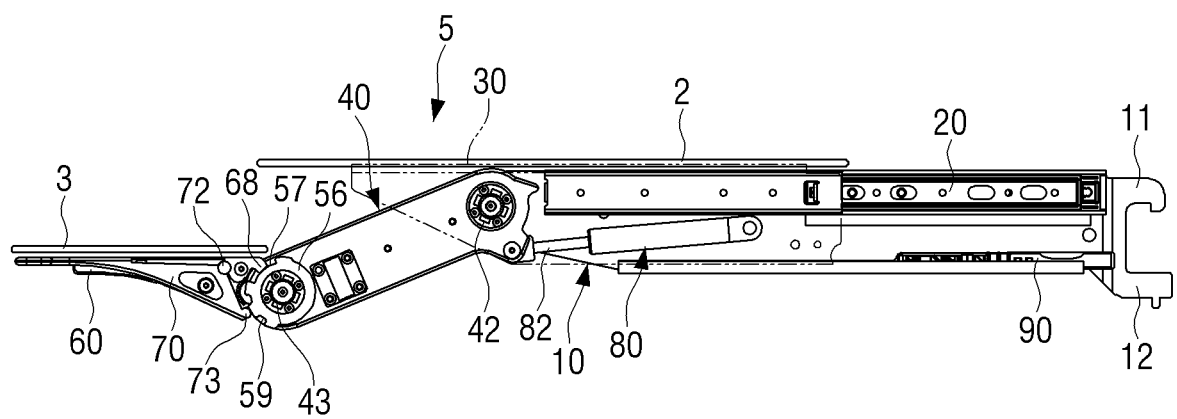

Next, the user pushes the front shelf plate 3 downward while holding the fixing lever 70. In other words, the user exerts a force downward on the front shelf plate 3. Thus, as illustrated in FIG. 10D, the support arm 40 rotates counter-clockwise about the first sprocket 42, and the front support bracket 60 rotates clockwise about the second sprocket 43.

At this time, the engaging protrusion 68 of the front support bracket 60 is moved counter-clockwise inside the operating groove 57 of the fixed ring plate 56 of the support arm 40. On the other hand, because the first sprocket 42 and the second sprocket 43 of the support arm 40 are connected by the chain 44, the front shelf plate 3 supported by the front support bracket 60 is moved downward while maintaining a horizontal state.

When the front shelf plate 3 is moved downward in a horizontal state and the support arm 40 is rotated by a predetermined angle in a counter-clockwise direction, the rotation of the support arm 40 is limited by the shock absorber 80. Therefore, the front shelf plate 3 is positioned at a predetermined distance below the rear shelf plate 2. At this time, as illustrated in FIG. 10E, the engaging protrusion 68 of the front support bracket 60 is in contact with the second end 57b of the operating groove 57 of the fixed ring plate 56 of the support arm 40, and the fixing protrusion 73 of the fixing lever 70 is inserted into the upper fixing groove 58 of the fixed ring plate 56 of the support arm 40.

Figure 10E:
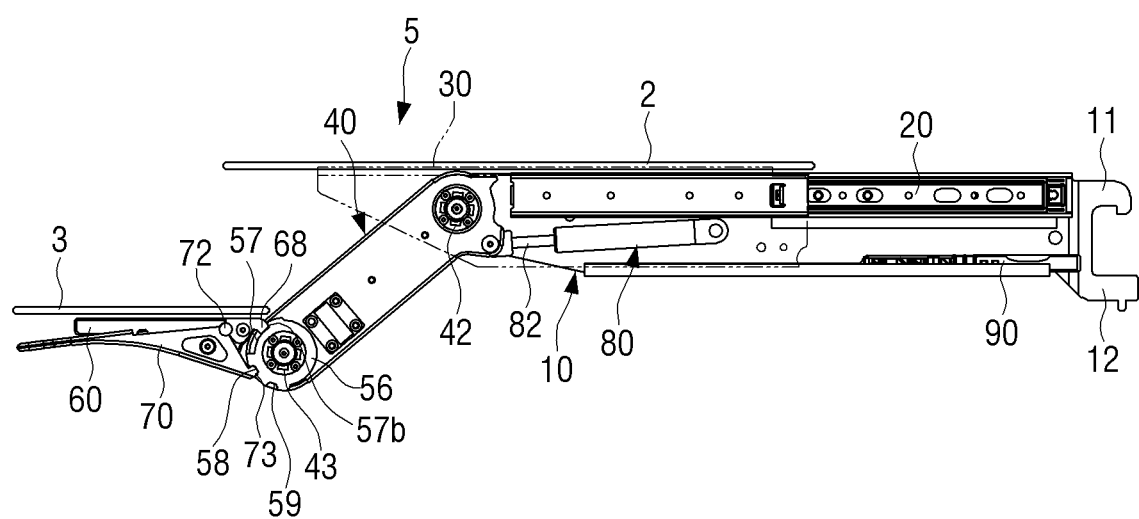

As illustrated in FIGS. 10E and 9, when the front shelf plate 3 is positioned below the rear shelf plate 2, the user may easily check and take out the objects on the rear shelf plate 2. After taking out the object from the rear shelf plate 2, the user returns the front shelf plate 3 to its original position. The method of returning the front shelf plate 3 is the opposite of the method shown in FIGS. 10A to 10E.

The method of returning the front shelf plate 3 to the original position is as follows.

First, the fixing lever 70 of the front support bracket 60 supporting the front shelf plate 3 positioned below the rear shelf plate 2 as illustrated in FIG. 10E is raised, so that the fixing protrusion 73 of the fixing lever 70 is removed from the upper fixing groove 58 of the fixed ring plate 56 of the support arm 40.

Next, the front shelf plate 3 is raised. Thus, as illustrated in FIG. 10C, the front shelf plate 3 is positioned on the same plane as the rear shelf plate 2. At this time, when the fixing lever 70 is released, the fixing protrusion 73 of the fixing lever 70 is inserted into the lower fixing groove 59 of the fixed ring plate 56 of the support arm 40 and the engaging protrusion 68 of the front support bracket 60 is in contact with the first end 57a of the operating groove 57 as illustrated in FIG. 10B.

Finally, when the front shelf plate 3 is pushed backward, the front shelf plate 3 and the rear shelf plate 2 is moved integrally, and as illustrated in FIG. 10A, the front shelf plate 3 and the rear shelf plate 2 return to the original position.

Hereinafter, a pull down refrigerator shelf 1' according to another embodiment of the disclosure will be described in detail with reference to FIGS. 11 to 16.

Figure 11:
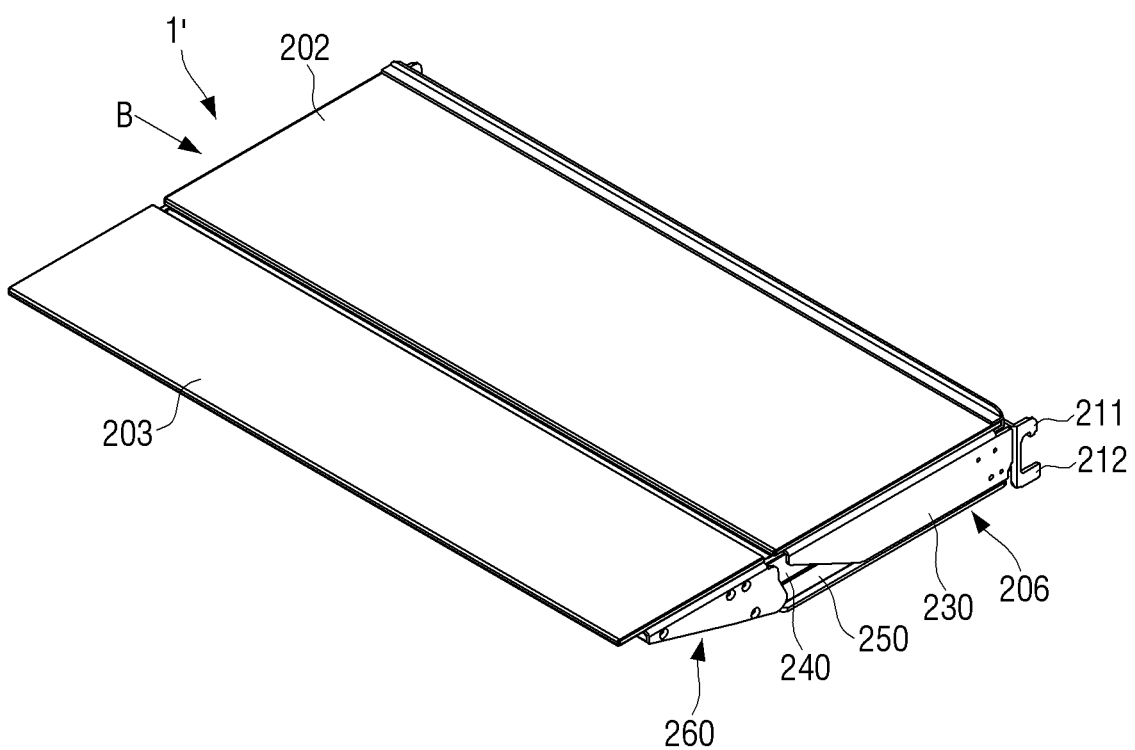
FIG. 11 is a perspective view illustrating a pull down refrigerator shelf according to another embodiment of the disclosure.
Figure 12:
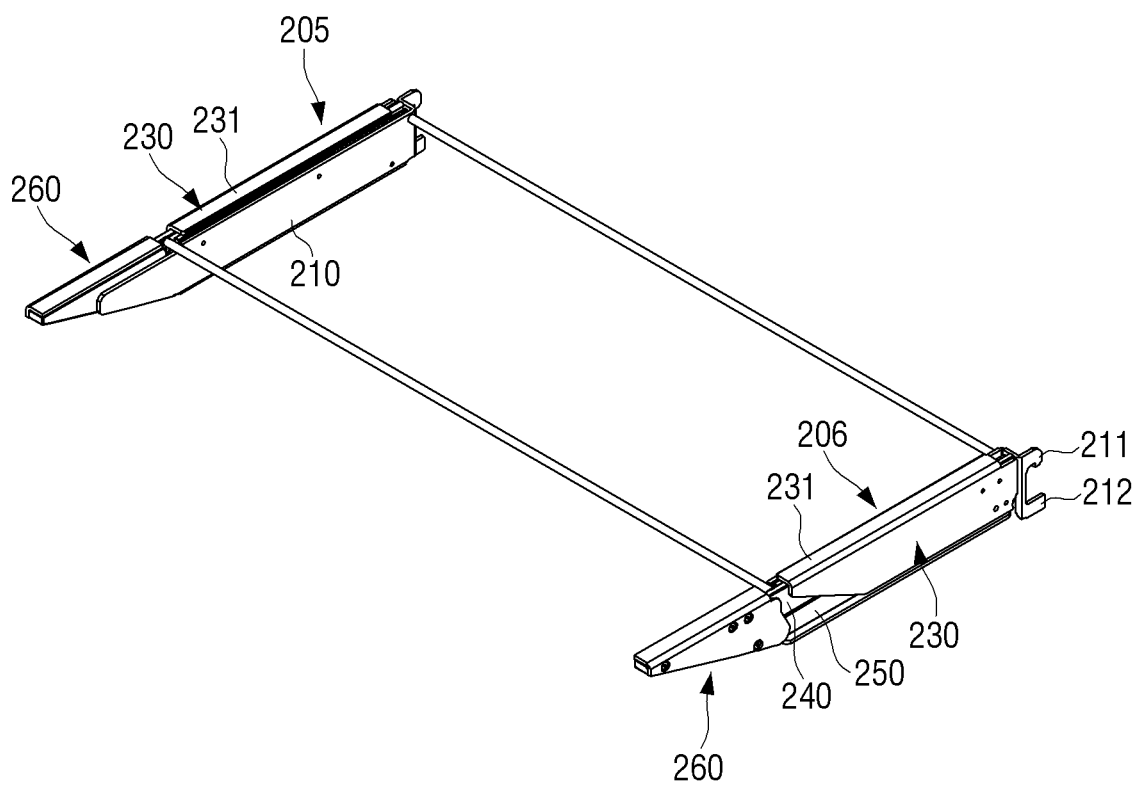
FIG. 12 is a perspective view illustrating the pull down refrigerator shelf of FIG. 11 from which a front shelf plate and a rear shelf plate are removed.
Figure 13:
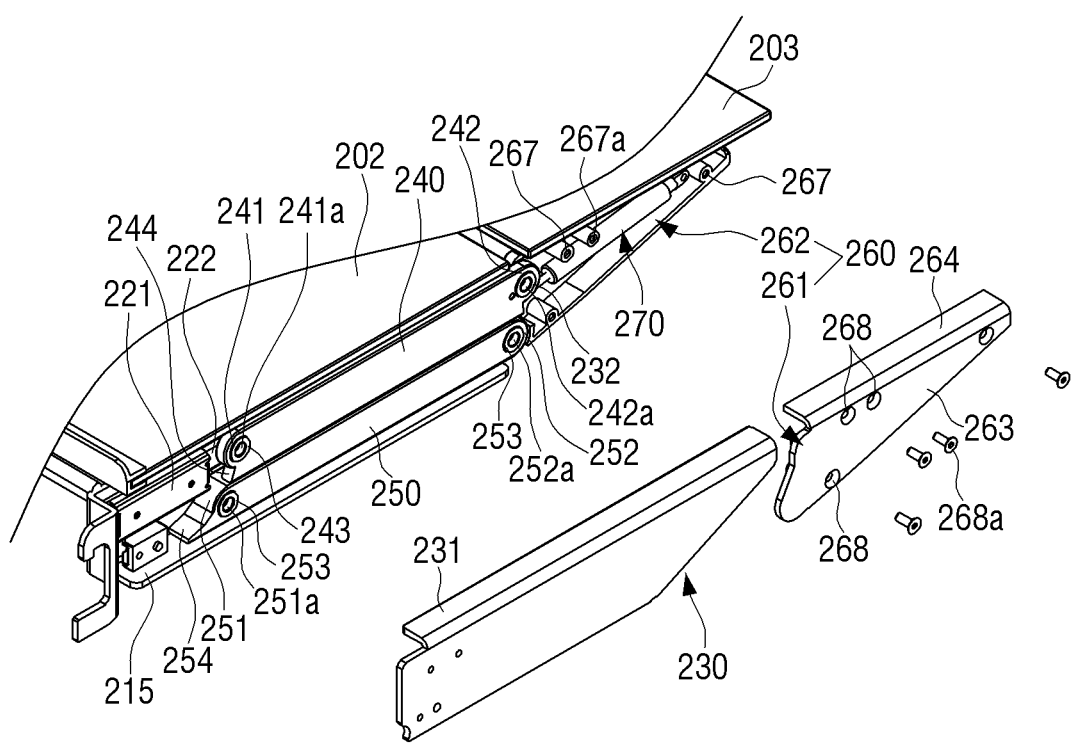
FIG. 13 is a partial perspective view illustrating the left shelf sliding and lowering mechanism of FIG. 11 viewed from the direction B in a state in which a main front support bracket and a rear support bracket are separated.
Figure 14:
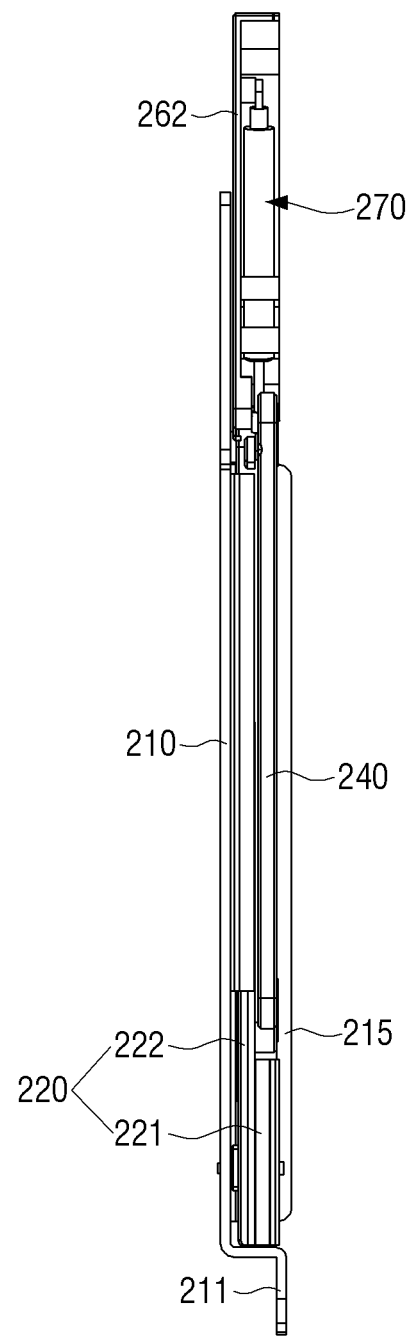
FIG. 14 is a plan view illustrating the left shelf sliding and lowering mechanism of FIG. 13.
Figure 15:
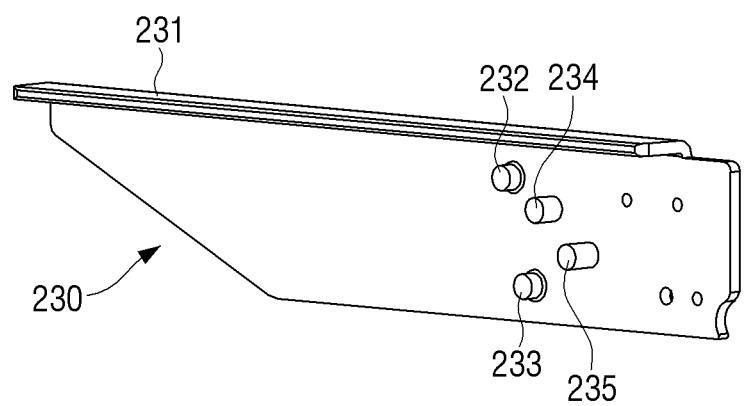
FIG. 15 is a rear perspective view of the rear support bracket of the left shelf sliding and lowering mechanism of FIG. 13.
Figure 16:
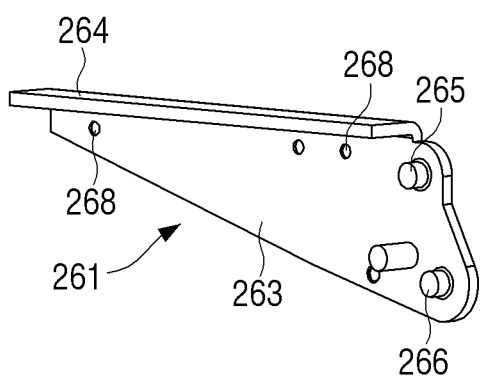
FIG. 16 is a rear perspective view of the main front support bracket of the left shelf sliding and lowering mechanism of FIG. 13.

FIG. 11 is a perspective view illustrating a pull down refrigerator shelf according to another embodiment of the disclosure. FIG. 12 is a perspective view illustrating the pull down refrigerator shelf of FIG. 11 from which a front shelf plate and a rear shelf plate are removed. FIG. 13 is a partial perspective view illustrating a left shelf sliding and lowering mechanism of the pull down refrigerator shelf of FIG. 11 viewed from the direction B in a state in which a main front support bracket and a rear support bracket are separated. FIG. 14 is a plan view illustrating the left shelf sliding and lowering mechanism of FIG. 13. FIG. 15 is a rear perspective view of the rear support bracket of the left shelf sliding and lowering mechanism of the pull down refrigerator shelf of FIG. 13. FIG. 16 is a rear perspective view of the main front support bracket of the left shelf sliding and lowering mechanism of FIG. 13.

Referring to FIGS. 11 to 14, a pull down refrigerator shelf 1' according to an embodiment of the disclosure may include a rear shelf plate 202, a front shelf plate 203, and a shelf sliding and lowering mechanism 205 and 206.

The rear shelf plate 202 may be formed in a rectangular shaped flat plate.

The front shelf plate 203 may be formed in a rectangular shaped flat plate similar to the rear shelf plate 202. The length of the front shelf plate 203 may be shorter than the length of the rear shelf plate 202.

The front shelf plate 203 is disposed at a predetermined distance from the front end of the rear shelf plate 202, and may selectively be positioned on the same plane as the rear shelf plate 202 or may be positioned below the rear shelf plate 202. In other words, the front shelf plate 203 may be positioned at one of the same level position where the front shelf plate 203 is positioned at the same level as the rear shelf plate 202 and the low level position where the front shelf plate 203 is positioned at a lower level than the rear shelf plate 202.

The shelf sliding and lowering mechanism 205 and 206 is disposed under the rear shelf plate 202 and the front shelf plate 203, so that the rear shelf plate 202 and the front shelf plate 203 may slide together as one body and the front shelf plate 203 may lower relative to the rear shelf plate 202 while maintaining a horizontal state.

In detail, the shelf sliding and lowering mechanism 205 and 206 may be formed so that when the front shelf plate 203 is pulled, the rear shelf plate 202 is moved linearly together with the front shelf plate 203 while maintaining the same level as the front shelf plate 203. In addition, the shelf sliding and lowering mechanism 205 and 206 may be formed so that when the front shelf plate 203 is moved forward by a predetermined distance, the front shelf plate 203 remains horizontal and moves downward to be positioned at the lower level position.

The shelf sliding and lowering mechanism 205 and 206 may include a left shelf sliding and lowering mechanism 205 and a right shelf sliding and lowering mechanism 206 that are disposed under the front shelf plate 203 and the rear shelf plate 202 and are spaced apart by a predetermined distance from each other.

Because the left shelf sliding and lowering mechanism 205 and the right shelf sliding and lowering mechanism 206 are formed in the same structure, only the left shelf sliding and lowering mechanism 205 will be described below. However, for convenience of explanation, the left shelf sliding and lowering mechanism 205 will be referred to as a shelf sliding and lowering mechanism 205 below.

Referring to FIGS. 13 and 14, the shelf sliding and lowering mechanism 205 may include a hanger 210, a slide rail 220, a rear support bracket 230, a first lever 240, a second lever 250, and a front support bracket 260.

The hanger 210 allows the pull down refrigerator shelf 1' to be detachably disposed in the storage compartment 103 of the refrigerator 100. At the rear end of the hanger 210, a hooking jaw 211 and a support protrusion 212 are provided. The hooking jaw 211 and the support protrusion 212 are the same as the hooking jaw 11 and the support protrusion 12 of the hanger 10 according to the above-described embodiment; therefore, detailed descriptions thereof are omitted.

In addition, a lever guide portion 215 may be provided at a lower end of the hanger 210. The lever guide portion 215 extends substantially vertically from the lower end of the hanger 210, and is formed to guide the slide movement of the second lever 205, which will be described later.

The slide rail 220 is disposed on the outer surface of the hanger 210 adjacent to the hooking jaw 211. Here, the outer surface of the hanger 10 refers to the opposite surface of a surface facing the hanger 210 of the right shelf sliding and lowering mechanism 206.

The slide rail 220 may include an upper slide rail 221 and a lower slide rail 222, and the upper slide rail 221 and the lower slide rail 222 are formed to slide in a straight line with respect to each other. The lower slide rail 222 is fixed to the outer surface of the hanger 210. The upper slide rail 221 is fixed to the rear support bracket 230. Therefore, the rear support bracket 230 may slide relative to the hanger 210.

The slide rail 220 is provided with a rail stopper that restricts the movement of the upper slide rail 221. The rail stopper may include a front rail stopper (not illustrated) disposed at the front end of the slide rail 220 and a rear rail stopper 224 disposed at the rear end of the slide rail 220.

The front rail stopper is disposed to limit the distance that the upper slide rail 221 moves forward. The rear rail stopper 224 is formed to block the upper slide rail 221 from moving toward the rear of the hanger 210, that is, toward the hooking jaw 211. Therefore, the upper slide rail 221 may not protrude from the rear of the hanger 210.

The rear support bracket 230 is formed to support the rear shelf plate 202. The rear support bracket 230 is formed in a rectangular plate shape having a long length, the upper end of the rear support bracket 230 is bent approximately 90 degrees to form a bent portion 231. The rear shelf plate 202 is placed on the bent portion 231 of the rear support bracket 230. The rear support bracket 230 may be fixed to the upper slide rail 221 with a plurality of screws.

The first lever 240 and the second lever 250 are provided to connect the rear support bracket 230 and the front support bracket 260. In detail, the first end 241 of the first lever 240 is rotatably disposed at the rear support bracket 230, and the second end 242 thereof is rotatably disposed at the front support bracket 260. The first lever 240 is formed in a substantially rectangular bar shape. A first rotating groove 241*a* is formed at the first end 241 of the first lever 240, and a second rotating groove 242*a* is formed at the second end 242 thereof.

The second lever 250 is disposed parallel to the first lever 240 under the first lever 240. The first end 251 of the second lever 250 is rotatably disposed at the rear support bracket 230, and the second end 252 thereof is rotatably disposed at the front support bracket 260. The second lever 250 is formed in a substantially rectangular bar shape. A first rotating groove 251*a* is formed at the first end 251 of the second lever 250, and a second rotating groove 252*a* is formed at the second end 252 thereof.

Referring to FIG. 15, the rear support bracket 230 is provided with a first rotation protrusion 232 configured to support the rotation of the first end 241 of the first lever 240 and a second rotation protrusion 233 configured to support the rotation of the first end 241 of the second lever 250. The first rotation protrusion 232 is inserted into the first rotating groove 241*a* of the first lever 240, and the second rotation protrusion 233 is inserted into the first rotating groove 251*a* of the second lever 250, so that the first lever 240 and the second lever 250 may rotate with respect to the rear support bracket 230.

A bearing 243 may be disposed between the first rotation protrusion 232 and the first rotating groove 241*a* of the first lever 240. Similarly, a bearing 253 may be disposed between the second rotation protrusion 233 and the first rotating groove 251*a* of the second lever 250.

In addition, the rear support bracket 230 may be provided with first and second lever stoppers 234 and 235 that limit the rotation of the first lever 240 and the second lever 250. In detail, an engaging jaw 244 is provided at the first end 241 of the first lever 240 disposed on the rear support bracket 230, and the rear support bracket 230 may be provided with a first lever stopper 234 on which the engaging jaw 244 of the first lever 240 is caught.

In addition, an engaging portion 254 is provided at the first end 251 of the second lever 250 disposed on the rear support bracket 230, and the rear support bracket 230 may be provided with a second lever stopper 235 on which the engaging portion 254 of the second lever 250 is caught. The first lever stopper 234 and the second lever stopper 235 may be formed so that when the first lever 240 and the second lever 250 rotate in one direction, the engaging jaw 244 of the first lever 240 and the engaging portion 254 of the second lever 250 are simultaneously caught on the first lever stopper 234 and the second lever stopper 235.

The front support bracket 260 is rotatably disposed at the second end 242 of the first lever 240 and the second end 252 of the second lever 250, and is formed to support the front shelf plate 203. In detail, the front support bracket 260 is rotatably disposed at the second rotating groove 242*a* of the second end 242 of the first lever 240 and the second rotating groove 252*a* of the second end 252 of the second lever 250.

The front support bracket 260 may include a main front support bracket 261 and a sub front support bracket 262. The main front support bracket 261 may include a main fixing part 263, which is rotatably disposed at the second end 242 of the first lever 240 and the second end 252 of the second lever 250 and is formed in a flat plate shape, and a shelf support part 264 that is bent at approximately 90 degrees with respect to the main fixing part 263 and supports the front shelf plate 203.

The main fixing part 263 is provided with a first rotation protrusion 265 and a second rotation protrusion 266 that are inserted into the second rotating groove 242*a* of the second end 242 of the first lever 240 and the second rotating groove 252*a* of the second end 252 of the second lever 250.

The sub front support bracket 262 is fixed to the main front support bracket 261. The sub front support bracket 262 is formed in a shape corresponding to the main fixing part 263. The sub front support bracket 262 may include a plurality of fixing rods 267 so that the sub front support bracket 262 is coupled to the main fixing part 263 and spaced apart by a predetermined distance from the main fixing part 263. A fixing groove 267*a* in which a female screw is formed is provided at the tip of each of the plurality of fixing rods 267.

The main front support bracket 261 is provided with a plurality of fixing holes 268 corresponding to the plurality of fixing grooves 267*a* of the sub front support bracket 262. Therefore, the main front support bracket 261 and the sub front support bracket 262 are coupled to each other by using the plurality of fixing holes 268, the plurality of fixing grooves 267*a*, and a plurality of screws 268*a*, thereby forming the front support bracket 260.

The front shelf plate 203 may be lowered by a predetermined distance with respect to the rear shelf plate 202 while maintaining a horizontal state by the first lever 240 and the second lever 250 that are disposed side by side, the first ends 241 and 251 of which are rotatably coupled to the rear support bracket 230, and the second ends 242 and 252 of which are rotatably coupled to the front support bracket 260.

In detail, when the front shelf plate 203 is pulled forward and the second lever 250 is moved out of the lever guide portion 215 of the hanger 210, the front shelf plate 203 lowers while maintaining a horizontal state. In the case of this embodiment, because the rear support bracket 230, the first lever 240, the second lever 250, and the front support bracket 260 constitute a four-section link, the front shelf plate 203 supported by the front support bracket 260 may lower while maintaining a horizontal state.

A shock absorber 270 may be provided inside the front support bracket 260 to decrease the speed at which the front shelf plate 203 lowers. One end of the shock absorber 270 is rotatably disposed at the second end 252 of the second lever 250, and the other end thereof is rotatably disposed at the sub front support bracket 262. When the shock absorber 270 is disposed inside the front support bracket 260, the descending speed of the front shelf plate 203 may be reduced compared to the case where the shock absorber 270 is not provided.

Hereinafter, the operation of the pull down refrigerator shelf 1' according to another embodiment of the disclosure will be described in detail with reference to FIGS. 17A to 17C.

Figure 17A:
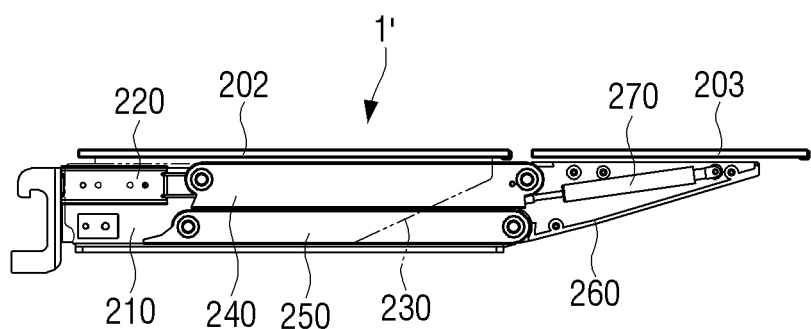
FIGS. 17A, 17B, and 17C are views for explaining an operation of a pull down refrigerator shelf according to another embodiment of the disclosure.
Figure 17B:
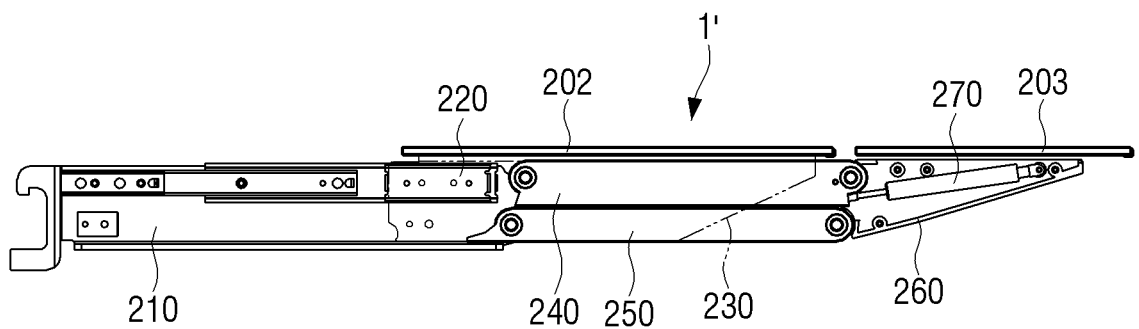
Figure 17C:
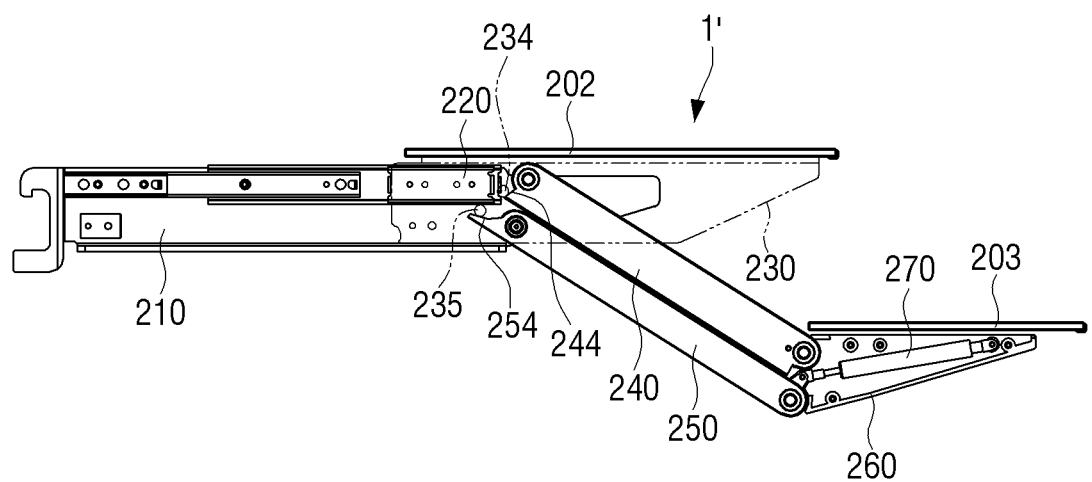

FIGS. 17A, 17B, and 17C are views for explaining an operation of a pull down refrigerator shelf according to another embodiment of the disclosure.

Referring to FIG. 17A, the front shelf plate 203 is positioned at the same level, that is, on the same plane as the rear shelf plate 202. In addition, both the front shelf plate 203 and the rear shelf plate 202 are located at the innermost side of the storage compartment 103 of the refrigerator 100 (see FIG. 1). At this time, the front support bracket 260 maintains a horizontal state in the same way as the rear support bracket 230. The first lever 240 and the second lever 250 are supported by the lever guide portion 215 of the hanger 210 to maintain a horizontal state.

Next, the front shelf plate 203 is pulled forward. Thus, the front shelf plate 203 and the rear shelf plate 202 are integrally moved to be positioned at the front of the refrigerator 100 as illustrated in FIG. 17B. At this time, the slide rail 220 and the first ends 241 and 251 of the first lever 240 and the second lever 250 are disposed at the rear support bracket 230, and the second ends 242 and 252 of the first lever 240 and the second lever 250 are rotatably disposed at the front support bracket 260, so that when the front shelf plate 203 is pulled, the rear shelf plate 202 supported by the rear support bracket 230 is also moved integrally.

When the front shelf plate 203 moves to the maximum in the forward direction, the second lever 250 is released from the lever guide portion 215 of the hanger 210. Then, both the first lever 240 and the second lever 250 rotate clockwise based on the first ends 241 and 251. At this time, the front shelf plate 203 supported by the front support bracket 260 moves downward while maintaining a horizontal state.

On the other hand, when the first lever 240 rotates a predetermined angle so that the engaging jaw 244 of the first lever 240 is caught by the first lever stopper 234 of the rear support bracket 230, the rotation of the first lever 240 is stopped. In addition, when the second lever 250 rotates a predetermined angle so that the engaging portion 254 of the second lever 250 is caught by the second lever stopper 235, the rotation of the second lever 250 is stopped. At this time, the engaging jaw 244 of the first lever 240 and the engaging portion 254 of the second lever 250 are provided to be caught by the first lever stopper 234 and the second lever stopper 235 almost simultaneously, so that the first lever 240 and the second lever 250 are stopped almost simultaneously.

FIG. 17C shows a state in which the front shelf plate 203 is lowered to the maximum by rotating the first lever 240 and the second lever 250 to the maximum.

As illustrated in FIG. 17C, when the front shelf plate 203 is positioned below the rear shelf plate 202, the user may easily check and take out the objects on the rear shelf plate 202. After taking out the object from the rear shelf plate 202, the user returns the front shelf plate 203 to its original position. The method of returning the front shelf plate 203 is the opposite of the method shown in FIGS. 17A to 17C.

The method of returning the front shelf plate 203 to the original position is as follows.

First, the front shelf plate 203 positioned below the rear shelf plate 202 as illustrated in FIG. 10C is raised.

When the front shelf plate 203 is positioned on the same plane as the rear shelf plate 202 as illustrated in FIG. 17B, the front shelf plate 203 is pushed back.

Thus, the front shelf plate 203 and the rear shelf plate 202 are moved integrally so that the front shelf plate 203 and the rear shelf plate 202 are returned to the original position as illustrated in FIG. 17A.

With the pull down refrigerator shelf and the refrigerator having the same according to an embodiment of the disclosure as described above, the user may pull the front shelf plate forward, and then position the front shelf plate lower than the rear shelf plate. Therefore, the user may easily access the objects located at the rear of the refrigerator shelf.

Hereinabove, the disclosure has been described as an illustrative method. It is to be understood that terms used herein are provided to describe the disclosure rather than limiting the disclosure. Various modifications and alternations of the disclosure may be made according to the contents described above. Therefore, the disclosure may be freely practiced without departing from the scope of the claims unless additionally mentioned.

What is claimed is:

1. A pull down refrigerator shelf for a storage compartment of a refrigerator, the pull down refrigerator shelf comprising:
   a rear shelf plate;
   a front shelf plate, disposed in front of the rear shelf plate, configured to be selectively positioned on a same plane as the rear shelf plate or lowered relative to the rear shelf plate; and
   a shelf sliding and lowering mechanism, disposed under the rear shelf plate and the front shelf plate, configured to allow the rear shelf plate and the front shelf plate to slide integrally and to allow the front shelf plate to be selectively positioned to be lowered relative to the rear shelf plate while maintaining a horizontal state in a state where the rear shelf plate is moved forward together with the front shelf plate and is stopped,
   wherein the shelf sliding and lowering mechanism comprises a left shelf sliding and lowering mechanism and a right shelf sliding and lowering mechanism which are disposed under the rear shelf plate and the front shelf plate and are spaced apart by a predetermined distance from each other,
   wherein each of the left shelf sliding and lowering mechanism and the right shelf sliding and lowering mechanism comprises:
      a rear support bracket configured to support the rear shelf plate;
      a slide rail configured to slide the rear support bracket;
      a hanger configured to fix the slide rail and detachably disposed in the refrigerator;
      a support arm, rotatably disposed at one end of the rear support bracket, configured to allow the front shelf plate to be lowered in the horizontal state;
      a shock absorber disposed on the rear support bracket and supporting one end of the support arm;
      a front support bracket, rotatably disposed at another end of the support arm, configured to support the front shelf plate; and
      a fixing lever provided in at least one of the left shelf sliding and lowering mechanism and the right shelf sliding and lowering mechanism, the fixing lever configured to allow the front support bracket to be fixed or rotated relative to the support arm, and
   wherein the support arm comprises:
      a housing having one side formed as an opening;
      first and second fixed shafts disposed on a bottom surface of the housing;
      a first sprocket and a second sprocket rotatably disposed on the first and second fixed shafts;
      a chain wound around the first sprocket and the second sprocket;
      a housing cover configured to cover the opening of the housing and to support the first sprocket and the second sprocket to rotate; and
      a fixed ring plate, provided on one end portion of the housing cover, configured to rotate or fix the front support bracket with respect to the housing together with the fixing lever.

2. The pull down refrigerator shelf as claimed in claim 1, wherein the shelf sliding and lowering mechanism further comprises:
   a damper, disposed on the hanger, configured to cushion an impact when rear support bracket slides; and
   a damper operator disposed on the rear support bracket to be in contact with the damper.

3. The pull down refrigerator shelf as claimed in claim 1, wherein the fixed ring plate comprises:
   an operating groove configured to limit a rotation angle of the front support bracket;

an upper fixing groove to which the fixing lever is coupled so that the front support bracket is fixed while the front shelf plate is positioned on a same plane as the rear shelf plate; and a lower fixing groove to which the fixing lever is coupled so that the front support bracket is fixed while the front shelf plate is positioned lowered relative to the rear shelf plate.

4. The pull down refrigerator shelf as claimed in claim 3, wherein the front support bracket includes an engaging protrusion to be inserted into the operating groove of the fixed ring plate, and wherein the fixing lever includes a fixing protrusion to be inserted into one of the upper fixing groove and the lower fixing groove of the fixed ring plate.

5. The pull down refrigerator shelf as claimed in claim 1, wherein the front support bracket is fixed to one end of the second sprocket which is exposed through the housing cover.

6. The pull down refrigerator shelf as claimed in claim 5, wherein the fixing lever is disposed to rotate at a predetermined angle with respect to the front support bracket.

7. The pull down refrigerator shelf as claimed in claim 6, wherein the fixing lever comprises:

a lever body that is triangular shaped;

a rotating shaft, provided at a first vertex of the lever body, and supporting rotation of the lever body with respect to the front support bracket;

a fixing protrusion, provided at a second vertex of the lever body, and inserted into an upper fixing groove or a lower fixing groove of the fixed ring plate;

a handle, provided near a third vertex of the lever body, configured to rotate the lever body about the rotating shaft; and a through hole formed in a center of the lever body and into which a fixing rod provided in the front support bracket is inserted.

8. The pull down refrigerator shelf as claimed in claim 5, wherein the front support bracket comprises:

a main front support bracket fixed to the second sprocket; and a sub front support bracket fixed to the main front support bracket.

9. The pull down refrigerator shelf as claimed in claim 1, wherein the shock absorber includes a cylinder and a rod inserted into the cylinder, and wherein one end of the cylinder is rotatably disposed at the rear support bracket, and one end of the rod is rotatably disposed at the support arm.

10. The pull down refrigerator shelf as claimed in claim 1, wherein the rear support bracket is provided with a stopper to limit rotation of the support arm, and one end of the support arm is provided with a projecting part to interfere with the stopper.

11. The pull down refrigerator shelf as claimed in claim 1, wherein each of the left shelf sliding and lowering mechanism and the right shelf sliding and lowering mechanism comprises:

a first lever including a first end rotatably disposed at the rear support bracket and a second end rotatably disposed at the front support bracket;

a second lever disposed parallel to the first lever and including a first end rotatably disposed at the rear support bracket and a second end rotatably disposed at the front support bracket; and a lever guide portion, vertically extending from a lower end of the hanger, configured to guide slide movement of the second lever, wherein while the second lever is moved out of the lever guide portion, the front shelf plate is lowered while maintaining the horizontal state.

12. The pull down refrigerator shelf as claimed in claim 11, wherein the first lever is provided with an engaging jaw at the first end disposed at the rear support bracket, and wherein the rear support bracket is provided with a first lever stopper on which the engaging jaw of the first lever is caught.

13. The pull down refrigerator shelf as claimed in claim 11, wherein an engaging portion is provided at the first end of the second lever disposed on the rear support bracket, and wherein the rear support bracket is provided with a second lever stopper on which the engaging portion of the second lever is caught.

14. The pull down refrigerator shelf as claimed in claim 11, wherein the front support bracket is provided with a shock absorber, and wherein one end of the shock absorber is rotatably disposed at the second end of the second lever.

15. The pull down refrigerator shelf as claimed in claim 1, wherein a length of the front shelf plate is shorter than a length of the rear shelf plate.

16. A refrigerator comprising:

a main body having an open front surface and a storage compartment therein;

a door disposed to open and close the storage compartment of the main body;

a pair of rack bars disposed on an inner surface of the storage compartment of the main body; and a pull down refrigerator shelf to be fixed to the pair of rack bars, wherein the pull down refrigerator shelf comprises:

a rear shelf plate;

a front shelf plate, disposed in front of the rear shelf plate, configured to be selectively positioned on a same plane as the rear shelf plate or lowered relative to the rear shelf plate; and a shelf sliding and lowering mechanism, disposed under the rear shelf plate and the front shelf plate, configured to allow the rear shelf plate and the front shelf plate to slide integrally, and to allow the front shelf plate to be selectively positioned to be lowered relative to the rear shelf plate while maintaining a horizontal state in a state where the rear shelf plate is moved forward with the front shelf plate and is stopped, wherein the shelf sliding and lowering mechanism comprises a left shelf sliding and lowering mechanism and a right shelf sliding and lowering mechanism which are disposed under the rear shelf plate and the front shelf plate and are spaced apart by a predetermined distance from each other, wherein each of the left shelf sliding and lowering mechanism and the right shelf sliding and lowering mechanism comprises:

a rear support bracket configured to support the rear shelf plate;

a slide rail configured to slide the rear support bracket;

a hanger configured to fix the slide rail and detachably disposed in the refrigerator;

a support arm, rotatably disposed at one end of the rear support bracket, configured to allow the front shelf plate to be lowered in the horizontal state;

a shock absorber disposed on the rear support bracket and supporting one end of the support arm;

a front support bracket, rotatably disposed at another end of the support arm, configured to support the front shelf plate; and a fixing lever provided in at least one of the left shelf sliding and lowering mechanism and the right shelf sliding and lowering mechanism, the fixing lever configured to allow the front support bracket to be fixed or rotated relative to the support arm, and wherein the support arm comprises:

a housing having one side formed as an opening;

first and second fixed shafts disposed on a bottom surface of the housing;

a first sprocket and a second sprocket rotatably disposed on the first and second fixed shafts;

a chain wound around the first and second sprockets;

a housing cover configured to cover the opening of the housing and to support the first sprocket and the second sprocket to rotate; and a fixed ring plate, provided on one end portion of the housing cover, configured to rotate or fix the front support bracket with respect to the housing together with the fixing lever.

17. The refrigerator as claimed in claim 16, wherein the front shelf plate of the pull down refrigerator shelf is positioned lower than the rear shelf plate in a state in which the front shelf plate is projected forward of the main body.

\* \* \* \* \*